US012160308B2

(12) United States Patent
Wang et al.

(10) Patent No.: US 12,160,308 B2
(45) Date of Patent: Dec. 3, 2024

(54) FIBER LINK DETECTION METHOD AND APPARATUS

(71) Applicant: Huawei Technologies Co., Ltd., Shenzhen (CN)

(72) Inventors: Jinhui Wang, Dongguan (CN); Cong Chen, Dongguan (CN); Jingfei Lv, Wuhan (CN)

(73) Assignee: HUAWEI TECHNOLOIGES CO., LTD., Shenzhen (CN)

( * ) Notice: Subject to any disclaimer, the term of this patent is extended or adjusted under 35 U.S.C. 154(b) by 177 days.

(21) Appl. No.: 17/840,965

(22) Filed: Jun. 15, 2022

(65) Prior Publication Data

US 2022/0311532 A1    Sep. 29, 2022

Related U.S. Application Data

(63) Continuation of application No. PCT/CN2020/129346, filed on Nov. 17, 2020.

(30) Foreign Application Priority Data

Dec. 16, 2019  (CN) .................. 201911295173.X
Mar. 26, 2020  (CN) .................. 202010223212.1

(51) Int. Cl.
   *H04J 3/06*       (2006.01)
   *H04B 10/079*  (2013.01)

(52) U.S. Cl.
   CPC ...... *H04J 3/0667* (2013.01); *H04B 10/07955* (2013.01)

(58) Field of Classification Search
   CPC .................................................. H04J 3/0667
   See application file for complete search history.

(56) References Cited

U.S. PATENT DOCUMENTS 10,313,103 B1 *  6/2019  Perras ................. H04B 10/516
10,389,645 B2 *  8/2019  Qi ........................... H04L 43/16
(Continued)

FOREIGN PATENT DOCUMENTS

CN    101277231 A    10/2008
CN    102301620 A    12/2011
(Continued)

OTHER PUBLICATIONS

ITU-T G.8275.1/Y.1369.1, "Series G: Transmission Systems and Media, Digital Systems and Networks, Packet over Transport aspects—Synchronization, quality and availability targets, Series Y: Global Information Infrastructure, Internet Protocol Aspects and Next-Generation Networks, Internet of Things and Smart Cities, Internet protocol aspects—Transport Precision time protocol telecom profile for phase/time synchronization with full timing support from the network," Jun. 2016, 56 pages.

(Continued)

*Primary Examiner* — Nathan M Cors
(74) *Attorney, Agent, or Firm* — Conley Rose, P.C.

(57) ABSTRACT

A fiber link detection method is implemented by a first network device of an optical communications network. The fiber link detection method includes obtaining a forward delay value indicating a forward delay of transmitting a first Precision Time Protocol (PTP) packet by a second interface of a second network device to a first interface of the first network device over a fiber link. A reverse delay value indicating a reverse delay of transmitting a second PTP packet by the first interface to the second interface over the fiber link is obtained, and a determination is made, based on the forward delay value, the reverse delay value, and a first threshold, that the fiber link comprises a third network device, where the first network device and the second network device support a PTP, and where the third network device does not support the PTP.

19 Claims, 7 Drawing Sheets

(56) References Cited

U.S. PATENT DOCUMENTS

| | | | |
|---|---|---|---|
| 2008/0069150 A1 | 3/2008 | Badt et al. | |
| 2014/0161438 A1* | 6/2014 | In De Betou | H04B 10/25753 398/5 |
| 2016/0105341 A1* | 4/2016 | Cavaliere | H04Q 11/0066 398/33 |
| 2017/0257836 A1* | 9/2017 | Ho | H04W 56/009 |

FOREIGN PATENT DOCUMENTS

| | | | | |
|---|---|---|---|---|
| CN | 106453364 | * | 2/2017 | H04L 29/06 |
| CN | 106453364 A | | 2/2017 | |
| CN | 107204888 A | | 9/2017 | |
| EP | 1931154 A1 | | 6/2008 | |
| WO | 2016177240 A1 | | 11/2016 | |
| WO | 2019174554 A1 | | 9/2019 | |

OTHER PUBLICATIONS

IEEE 1588V2,IEEE Std 1588-2008 (Revision of IEEE Std 1588-2002), "IEEE Standard for a Precision Clock Synchronization Protocol for Networked Measurement and Control Systems, IEEE Instrumentation and Measurement Society," Technical Committee on Sensor Technology (TC-9), Jul. 24, 2008, 289 pages.

* cited by examiner

FIBER LINK DETECTION METHOD AND APPARATUS

CROSS-REFERENCE TO RELATED APPLICATIONS

This is a continuation of International Patent Application No. PCT/CN2020/129346 filed on Nov. 17, 2020, which claims priority to Chinese Patent Application No. 202010223212.1 filed on Mar. 26, 2020 and Chinese Patent Application No. 201911295173.X filed on Dec. 16, 2019. All of the aforementioned patent applications are hereby incorporated by reference in their entireties.

TECHNICAL FIELD

This disclosure relates to the field of time synchronization, and in particular, to a fiber link detection method and apparatus.

BACKGROUND

Time synchronization means that time of all devices keeps consistent. If the time of all the devices cannot keep consistent, some problems may be caused. For example, in the telecommunications field, if time of all devices in a telecommunications network is not synchronized, problems such as inaccurate charging time and inaccurate alarm time may be caused.

Some protocols used for time synchronization may be used between devices to perform time synchronization. For example, the Institute of Electrical and Electronics Engineers (IEEE) 1588 Protocol is used to perform time synchronization. The IEEE 1588 Protocol is also referred to as the Precision Time Protocol (PTP). A plurality of devices such as routers and switches in the telecommunications network may perform time synchronization by using the foregoing protocol.

An effect of performing time synchronization by using the IEEE 1588 Protocol is not good currently. Therefore, a solution is required to resolve the foregoing problem.

SUMMARY

Embodiments of this disclosure provide a fiber link detection method and apparatus, to improve a time synchronization effect.

According to a first aspect, an embodiment of this disclosure provides a fiber link detection method. The method may be applied to an optical communications network. The optical communications network includes a first network device and a second network device. A first interface of the first network device communicates with a second interface of the second network device over a first fiber link. Both the first network device and the second network device support the PTP. When the first interface of the first network device and the second interface of the second network device perform time synchronization by using the PTP, the first network device may determine whether the first fiber link includes a third network device that does not support the PTP. The first network device is a slave device, and the second network device is a master device. Further, the first network device may obtain a forward delay value and a reverse delay value, and determine, based on the forward delay value, the reverse delay value, and a first threshold, whether the first fiber link includes the third network device. The forward delay value is used to indicate a forward delay of transmitting a PTP packet by the second interface to the first interface over the first fiber link. The reverse delay value is used to indicate a reverse delay of transmitting a PTP packet by the first interface to the second interface over the first fiber link. If the first fiber link includes the third network device that does not support PTP, precision of time synchronization between the first network device and the second network device is affected. Therefore, according to the solution in this embodiment of this disclosure, it may be determined whether the first fiber link includes the third network device, and when it is determined that the first fiber link includes the third network device, corresponding processing may be further performed, so as to improve time synchronization precision.

In a possible implementation, the first network device may obtain the forward delay value by sending a first PTP packet to the first interface through the second interface over the first fiber link. The first network device may obtain a second timestamp and a first timestamp, and determine a difference between the second timestamp and the first timestamp as the forward delay value. The first timestamp is used to indicate a moment at which the second interface sends the first PTP packet to the first interface over the first fiber link, and the second timestamp is used to indicate a moment at which the first interface receives the first PTP packet. The first network device may obtain the reverse delay value by sending a second PTP packet to the second interface through the first interface over the first fiber link. Further, the first network device may obtain a third timestamp and a fourth timestamp, and determine a difference between the third timestamp and the fourth timestamp as the reverse delay value. The third timestamp is used to indicate a moment at which the first interface sends the second PTP packet to the second interface over the first fiber link, and the fourth timestamp is used to indicate a moment at which the second interface receives the second PTP packet.

In a possible implementation, the first PTP packet may be, for example, a sync packet, and the second PTP packet may be, for example, a delay_req packet. Alternatively, the first PTP packet may be a pdelay_resp packet, and the second PTP packet may be a pdelay_req packet.

In a possible implementation, for example, a specific implementation in which the first network device determines, based on the forward delay value, the reverse delay value, and the first threshold, that the first fiber link includes the third network device that does not support PTP may include, after obtaining the forward delay value and the reverse delay value, the first network device may calculate an average delay value of the first fiber link. Further, the first network device may determine an average of the forward delay value and the reverse delay value as the average delay value of the first fiber link. When the average delay value is greater than the first threshold, the first network device determines that the first fiber link includes the third network device that does not support PTP. The first threshold is a maximum delay of transmitting a PTP packet on the first fiber link when the first fiber link includes no other device.

In a possible implementation, for the optical communications network, the first network device includes an optical module, the optical module includes a light source, and the light source is used to provide an optical signal, so that a PTP packet sent by the first interface can be transmitted over the first fiber link. If the first fiber link does not include the third network device, the first threshold may be determined based on a transmission distance of an optical module of the first interface and a transmission delay corresponding to a per-unit transmission distance. Further, the first threshold may be equal to a product of the transmission distance and the transmission delay corresponding to the per-unit transmission distance.

In a possible implementation, if the first fiber link does not include the third network device, an optical power received by the first interface is theoretically equal to an optical power sent by the second interface minus an optical power loss on the first fiber link. Therefore, a specific implementation in which the first network device determines, based on the forward delay value, the reverse delay value, and the first threshold, that the first fiber link includes the third network device that does not support PTP may include that the first network device calculates an average delay value of the first fiber link based on the forward delay value and the reverse delay value, the first network device calculates a transmission distance of the first fiber link based on the average delay value, the first network device calculates a first receive optical power based on the transmission distance, a transmit optical power of an optical module of the second interface, and an optical signal attenuation coefficient of the optical module, and if an actual optical power of an optical signal received by the first interface is greater than the first receive optical power, and a difference between the actual optical power and the first receive optical power is greater than or equal to the first threshold, the first network device determines that the first fiber link includes the third network device. If the actual optical power of the optical signal received by the first interface is greater than the first receive optical power, and the difference between the actual optical power and the first receive optical power is greater than or equal to the first threshold, it indicates that the actual optical power received by the first interface is far greater than an optical power theoretically received by the first network device when the first fiber link does not include the third network device. In this case, the first network device may determine that the first fiber link includes the third network device. Because the third network device also has an optical module, the actual optical power of the optical signal received by the first interface is far greater than the first receive optical power.

In a possible implementation, a specific implementation in which the first network device determines, based on the forward delay value, the reverse delay value, and the first threshold, that the first fiber link includes the third network device that does not support PTP may alternatively include that the first network device calculates a delay parameter of the first fiber link based on N forward delay values and N reverse delay values that are obtained within a preset time period, and determines, based on the delay parameter of the first fiber link and the first threshold, that the first fiber link includes the third network device.

In a possible implementation, for the N forward delay values and the N reverse delay values, one average delay value may be determined based on one forward delay value and one reverse delay value, and therefore N average delay values may be determined based on the N forward delay values and the N reverse delay values. In addition, one time offset may be determined based on one forward delay value and one reverse delay value. In this disclosure, the delay parameter of the first fiber link is a parameter that can reflect a delay of the first fiber link. The delay parameter of the first fiber link is not limited in this embodiment of this disclosure. An average of the foregoing N average delays, an average of the foregoing N time offsets, a fluctuation status of the foregoing N average delays, a peak-to-peak value of the foregoing N forward delays, a peak-to-peak value of the foregoing N reverse delays, and a minimum delay packet ratio each may reflect the delay of the first fiber link. Therefore, the delay parameter may include any one or more of the following: the average of the N average delay values, the peak-to-peak value of the N forward delay values, the peak-to-peak value of the N reverse delay values, the average of the N time offsets, the minimum delay packet ratio value, and a fluctuation coefficient of the N average delay values. The fluctuation coefficient of the N average delay values may be used to indicate the fluctuation status of the N average delay values.

In a possible implementation, if the first fiber link does not include the third network device, the average of the N average delays theoretically should not be greater than the first threshold. The first threshold is a maximum value of a corresponding average delay of transmitting a PTP packet between the first network device and the second network device when the first fiber link does not include the third network device. Therefore, if the delay parameter of the first fiber link is the average of the N average delays, for example, when the average of the N average delays is greater than the first threshold, the first network device may determine that the first fiber link includes the third network device.

In a possible implementation, if the first fiber link does not include the third network device, the average of the N time offsets theoretically should not be greater than the first threshold. The first threshold is a maximum value of a time offset obtained by transmitting a PTP packet between the first network device and the second network device when the first fiber link does not include the third network device. Therefore, if the delay parameter of the first fiber link is the average of the N time offsets, for example, when the average of the N time offsets is greater than the first threshold, the first network device may determine that the first fiber link includes the third network device.

In a possible implementation, if the first fiber link does not include the third network device, the peak-to-peak value of the N forward delay values is usually not very large, in other words, is usually not greater than the first threshold. The first threshold may be, for example, an empirical value. Therefore, if the delay parameter of the first fiber link is the peak-to-peak value of the N forward delays, for example, when the peak-to-peak value of the N forward delay values is greater than the first threshold, the first network device may determine that the first fiber link includes the third network device. The peak-to-peak value of the N forward delays is a difference between a largest value and a smallest value in the N forward delay values.

In a possible implementation, if the first fiber link does not include the third network device, the peak-to-peak value of the N reverse delay values is usually not very large, in other words, is usually not greater than the first threshold. The first threshold may be, for example, an empirical value. Therefore, if the delay parameter of the first fiber link is the peak-to-peak value of the N reverse delays, for example, when the peak-to-peak value of the N reverse delay values is greater than the first threshold, the first network device may determine that the first fiber link includes the third network device. The peak-to-peak value of the N reverse delays is a difference between a largest value and a smallest value in the N reverse delay values.

In a possible implementation, if the first fiber link does not include the third network device, the N average delay values theoretically should be very close, in other words, the N average delay values slightly fluctuate. Therefore, if the delay parameter of the first fiber link is the fluctuation coefficient of the N average delay values, and the fluctuation coefficient of the N average delay values is greater than the first threshold, the first network device may determine that the first fiber link includes the third network device. The first threshold mentioned herein may be an empirical value.

In a possible implementation, if the first fiber link does not include the third network device, the minimum delay packet ratio is relatively large, and is usually greater than 90%. Therefore, if the delay parameter of the first fiber link is the minimum delay packet ratio, and the minimum delay packet ratio is less than the first threshold, the first network device may determine that the first fiber link includes the third network device. In this case, the first threshold may be, for example, 90%.

According to a second aspect, an embodiment of this disclosure provides a fiber link detection method. The method may be applied to an optical communications network. The optical communications network includes a first network device and a second network device. A first interface of the first network device communicates with a second interface of the second network device over a first fiber link. Both the first network device and the second network device support the PTP. When the first interface of the first network device and the second interface of the second network device perform time synchronization by using the PTP, the first network device may determine whether the first fiber link includes a third network device that does not support the PTP. The first network device is a slave device, and the second network device is a master device. Further, the first network device may obtain an average delay value, and determine, based on the average delay value and a first threshold, whether the first fiber link includes a third network device. The average delay value is used to indicate an average of a delay of transmitting a PTP packet by the first interface over the first fiber link and a delay of transmitting a PTP packet by the second interface over the first fiber link. If the first fiber link includes the third network device that does not support PTP, precision of time synchronization between the first network device and the second network device is affected. Therefore, according to the solution in this embodiment of this disclosure, it may be determined whether the first fiber link includes the third network device, and when it is determined that the first fiber link includes the third network device, corresponding processing may be further performed, so as to improve time synchronization precision.

In a possible implementation, the first network device may obtain the average delay value by using a first PTP packet and a second PTP packet that are transmitted between the first interface and the second interface. Further, the first network device may obtain a first timestamp, a second timestamp, and a third timestamp, and obtain the average delay value based on the first timestamp, the second timestamp, and the third timestamp. The first timestamp is used to indicate a moment at which the first interface sends the first PTP packet to the second interface over the first fiber link, the third timestamp is used to indicate a moment at which the first interface receives the second PTP packet sent by the second interface over the first fiber link, and the second timestamp is used to indicate a time difference between a moment at which the second interface sends the second PTP packet and a moment at which the second interface receives the first PTP packet.

In a possible implementation, the first PTP packet is a pdelay_req packet, and the second PTP packet is a pdelay_resp packet.

In a possible implementation, for example, a specific implementation in which the first network device determines, based on the average delay value and the first threshold, that the first fiber link includes the third network device may include, if the average delay value is greater than the first threshold, the first network device determines that the first fiber link includes the third network device.

In a possible implementation, the first threshold may be determined based on a transmission distance of an optical module of the second interface and a transmission delay corresponding to a per-unit transmission distance.

In a possible implementation, for example, a specific implementation in which the first network device determines, based on the average delay value and the first threshold, that the first fiber link includes the third network device may include that the first network device calculates a transmission distance of the first fiber link based on the average delay value, the first network device calculates a first receive optical power based on the transmission distance, a transmit optical power of an optical module of the second interface, and an optical signal attenuation coefficient of the optical module, and if an actual optical power of an optical signal received by the first interface is greater than the first receive optical power, and a difference between the actual optical power and the first receive optical power is greater than or equal to the first threshold, the first network device, determines that the first fiber link includes the third network device.

In a possible implementation, for example, a specific implementation in which the first network device determines, based on the average delay value and the first threshold, that the first fiber link includes the third network device may include that the first network device calculates a delay parameter of the first fiber link based on N average delay values that are obtained within a preset time period, and the first network device determines, based on the delay parameter and the first threshold, that the first fiber link includes the third network device.

In a possible implementation, the delay parameter includes any one or more of the following: an average of the N average delay values, a minimum delay packet ratio value, and a fluctuation coefficient of the N average delay values. The minimum delay packet ratio value is a ratio of a first value to N, the first value is a quantity of average delay values whose differences from a minimum average delay value each are less than a second threshold in the N average delay values, and the minimum average delay value is a smallest value of the N average delay values, and the fluctuation coefficient of the N average delay values is used to indicate a fluctuation status of the N average delay values.

In a possible implementation, when the delay parameter is the average of the N average delay values or the fluctuation coefficient of the N average delay values, for example, a specific implementation in which the first network device determines, based on the average delay value and the first threshold, that the first fiber link includes the third network device may include, when the delay parameter is greater than the first threshold, the first network device determines that the first fiber link includes the third network device.

In a possible implementation, when the delay parameter is the minimum delay packet ratio value, for example, a specific implementation in which the first network device determines, based on the average delay value and the first threshold, that the first fiber link includes the third network device may include, when the delay parameter is less than the first threshold, the first network device determines that the first fiber link includes the third network device.

According to a third aspect, an embodiment of this disclosure provides a fiber link detection method. The method may be applied to an optical communications network. The optical communications network includes a first network device and a second network device. A first interface of the first network device communicates with a second interface of the second network device over a first fiber link. Both the first network device and the second network device support the PTP. When the first interface of the first network device and the second interface of the second network device perform time synchronization by using the PTP, the first network device may determine whether the first fiber link includes a third network device that does not support the PTP. The first network device is a slave device, and the second network device is a master device. If the first fiber link does not include the third network device that does not support PTP, after the second interface is disabled, the first interface detects an optical signal loss (LOS) signal and an Ethernet linkdown signal within a short period of time. Therefore, after the second interface is disabled, if the first interface does not detect the LOS signal or the linkdown signal within a period of time, it may indicate that the first fiber link includes the third network device. Therefore, after the first network device determines that the second interface of the second network device is disabled, if the first interface does not determine an optical signal loss of a light source of the second interface within a period of time, or if the first interface does not determine Ethernet linkdown between the second interface and the first interface within a period of time, the first network device determines that the first fiber link includes the third network device that does not support PTP. When it is determined that the first fiber link includes the third network device, corresponding processing may be further performed, so as to improve time synchronization precision.

In a possible implementation, if the second interface is disabled for a long period of time, the first interface still detects the LOS signal and the linkdown signal after a period of time. In addition, if the second interface is disabled for a long period of time, normal communication between the first interface and the second interface is also affected. Therefore, in an implementation of this embodiment of this disclosure, duration in which the first interface is disabled is first duration. The first duration is less than or equal to a first threshold. This can ensure accuracy of a determining result of determining that the first fiber link includes the third network device, and prevent normal communication between the first interface and the second interface from being affected as much as possible.

In a possible implementation, after determining that the first fiber link includes the third network device, the first network device may further output a conclusion used to indicate that the first fiber link includes the third network device. The output includes but is not limited to controlling display of a display device, controlling play of a voice play device, controlling print of a print device, and the like.

According to a fourth aspect, an embodiment of this disclosure provides a fiber link detection method. The method may be applied to an optical communications network. The optical communications network includes a first network device and a second network device. A first interface of the first network device communicates with a second interface of the second network device over a first fiber link. Both the first network device and the second network device support the PTP. When the first interface of the first network device and the second interface of the second network device perform time synchronization by using the PTP, the first network device may determine whether the first fiber link includes a third network device that does not support the PTP. The first network device is a slave device, and the second network device is a master device. A preset rate at which the second interface sends a message to the first interface is determined based on an Ethernet service processed by the first network device and the second device. Generally, if a PTP packet transmitted between the first interface and the second interface does not pass through a device that does not support PTP, a difference between a rate at which the first interface receives a PTP packet and the preset rate is theoretically equal to a difference between a first rate and the preset rate. For example, if the difference between the first rate and the preset rate is a first difference, the difference between the rate at which the first interface receives a PTP packet and the preset rate is theoretically not much different from the first difference. However, if a PTP packet transmitted between the first interface and the second interface passes through a device that does not support PTP, a difference between a rate at which the first interface receives a PTP packet and the preset rate may be greatly different from a difference between a first rate and the preset rate. The foregoing device that does not support PTP, for example, a wavelength division device, may modify a rate of a PTP packet. Therefore, the first network device may determine that a rate at which the second interface sends a PTP packet to the first interface over the first fiber link is the first rate, and if a difference between a second difference and the first difference is greater than or equal to a preset difference, the first network device determines that the first fiber link includes the third network device that does not support PTP. The difference between the first rate and the preset rate is the first difference, the preset rate is determined based on an Ethernet service processed by the first interface and the second interface, and the second difference is the difference between the rate at which the first interface receives a PTP packet and the preset rate. When it is determined that the first fiber link includes the third network device, corresponding processing may be further performed, so as to improve time synchronization precision.

In a possible implementation, after determining that the first fiber link includes the third network device, the first network device may further output a conclusion used to indicate that the first fiber link includes the third network device. Management personnel may perform processing in time based on output content, so as to improve time synchronization precision.

According to a fifth aspect, an embodiment of this disclosure provides a fiber link detection method. The method may be applied to an optical communications network. The optical communications network includes a first network device and a second network device. A first interface of the first network device communicates with a second interface of the second network device over a first fiber link. Both the first network device and the second network device support the PTP. When the first interface of the first network device and the second interface of the second network device perform time synchronization by using the PTP, the first network device may determine whether the first fiber link includes a third network device that does not support the PTP. The first network device is a slave device, and the second network device is a master device. Further, the first network device determines that a quantity of Ethernet service preambles included in a PTP packet that is sent by the second interface to the first interface over the first fiber link is a first quantity. The first network device determines a second quantity. The second quantity is a quantity of Ethernet service preambles included in a PTP packet that is received by the first interface from the second interface. If the first quantity is different from the second quantity, the first network device determines that the first fiber link includes the third network device. The PTP packet sent by the second interface to the first interface may carry an Ethernet service preamble. There may be different quantities of Ethernet service preambles. Currently, there may be six or seven Ethernet service preambles. If the PTP packet sent by the second interface to the first interface passes through a network device that does not support PTP, the network device that does not support PTP may modify the quantity of Ethernet service preambles. In view of this, if the quantity of Ethernet service preambles included in the PTP packet received by the first interface is different from the quantity of Ethernet service preambles included in the PTP packet sent by the second interface, in other words, the second quantity is different from the first quantity, it indicates that the quantity of Ethernet service preambles is modified, so that the first network device can determine that the first fiber link includes the third network device. When it is determined that the first fiber link includes the third network device, corresponding processing may be further performed, so as to improve time synchronization precision.

In a possible implementation, after determining that the first fiber link includes the third network device, the first network device may further output a conclusion used to indicate that the first fiber link includes the third network device. Management personnel may perform processing in time based on output content, so as to improve time synchronization precision.

According to a sixth aspect, an embodiment of this disclosure provides a fiber link detection apparatus. The apparatus is applied to an optical communications network. The optical communications network includes a first network device and a second network device. A first interface of the first network device communicates with a second interface of the second network device over a first fiber link. The apparatus includes a first obtaining unit, a second obtaining unit, and a determining unit. The first obtaining unit is configured to obtain a forward delay value. The forward delay value is used to indicate a forward delay of transmitting a PTP packet by the second interface to the first interface over the first fiber link. The second obtaining unit is configured to obtain a reverse delay value. The reverse delay value is used to indicate a reverse delay of transmitting a PTP packet by the first interface to the second interface over the first fiber link. The determining unit is configured to determine, based on the forward delay value, the reverse delay value, and a first threshold, that the first fiber link includes a third network device. The first network device and the second network device support PTP, and the third network device does not support PTP.

In a possible implementation, the first obtaining unit is further configured to obtain a second timestamp and a first timestamp, and determine a difference between the second timestamp and the first timestamp as the forward delay value. The first timestamp is used to indicate a moment at which the second interface sends a first PTP packet to the first interface over the first fiber link, and the second timestamp is used to indicate a moment at which the first interface receives the first PTP packet. The second obtaining unit is further configured to obtain a third timestamp and a fourth timestamp, and determine a difference between the fourth timestamp and the third timestamp as the reverse delay value. The third timestamp is used to indicate a moment at which the first interface sends a second PTP packet to the second interface over the first fiber link, and the fourth timestamp is used to indicate a moment at which the second interface receives the second PTP packet.

In a possible implementation, the first PTP packet is a synchronization sync packet, and the second PTP packet is a delay request delay_req packet, or the first PTP packet is a delay response pdelay_resp packet, and the second PTP packet is a delay request pdelay_req packet.

In a possible implementation, the determining unit is further configured to calculate an average delay value of the first fiber link based on the forward delay value and the reverse delay value, and if the average delay value is greater than the first threshold, determine that the first fiber link includes the third network device.

In a possible implementation, the first threshold is determined based on a transmission distance of an optical module of the second interface and a transmission delay corresponding to a per-unit transmission distance.

In a possible implementation, the determining unit is further configured to calculate an average delay value of the first fiber link based on the forward delay value and the reverse delay value, calculate a transmission distance of the first fiber link based on the average delay value, calculate a first receive optical power based on the transmission distance, a transmit optical power of an optical module of the second interface, and an optical signal attenuation coefficient of the optical module, and if an actual optical power of an optical signal received by the first interface is greater than the first receive optical power, and a difference between the actual optical power and the first receive optical power is greater than or equal to the first threshold, determine that the first fiber link includes the third network device.

In a possible implementation, the determining unit is further configured to calculate a delay parameter of the first fiber link based on N forward delay values and N reverse delay values that are obtained within a preset time period, and determine, based on the delay parameter and the first threshold, that the first fiber link includes the third network device.

In a possible implementation, the delay parameter includes any one or more of the following: an average of N average delay values, a peak-to-peak value of the N forward delay values, a peak-to-peak value of the N reverse delay values, an average of N time offsets, a minimum delay packet ratio value, and a fluctuation coefficient of the N average delay values. The average delay value is an average of the forward delay value and the reverse delay value, and one forward delay value and one reverse delay value correspond to one average delay value, the time offset is calculated based on a difference between the reverse delay value and the forward delay value, and one forward delay value and one reverse delay value correspond to one time offset, the minimum delay packet ratio value is a ratio of a first value to N, the first value is a quantity of average delay values whose differences from a minimum average delay value each are less than a second threshold in the N average delay values, and the minimum average delay value is a smallest value of the N average delay values, and the fluctuation coefficient of the N average delay values is used to indicate a fluctuation status of the N average delay values.

In a possible implementation, when the delay parameter is the average of the N average delay values, or the peak-to-peak value of the N forward delay values, or the peak-to-peak value of the N reverse delay values, or the average of the N time offsets, or the fluctuation coefficient of the N average delay values, the determining unit is further configured to when the delay parameter is greater than the first threshold, determine that the first fiber link includes the third network device.

In a possible implementation, when the delay parameter is the minimum delay packet ratio value, the determining unit is further configured to, when the delay parameter is less than the first threshold, determine that the first fiber link includes the third network device.

According to a seventh aspect, an embodiment of this disclosure provides a fiber link detection apparatus. The apparatus is applied to an optical communications network. The optical communications network includes a first network device and a second network device. A first interface of the first network device communicates with a second interface of the second network device over a first fiber link. The apparatus includes an obtaining unit and a determining unit. The obtaining unit is configured to obtain an average delay value. The average delay value is used to indicate an average of a delay of transmitting a PTP packet by the first interface over the first fiber link and a delay of transmitting a PTP packet by the second interface over the first fiber link. The determining unit is configured to determine, based on the average delay value and a first threshold, that the first fiber link includes a third network device. The first network device and the second network device support PTP, and the third network device does not support PTP.

In a possible implementation, the obtaining unit is further configured to obtain a first timestamp, a second timestamp, and a third timestamp, where the first timestamp is used to indicate a moment at which the first interface sends a first PTP packet to the second interface over the first fiber link, the third timestamp is used to indicate a moment at which the first interface receives a second PTP packet sent by the second interface over the first fiber link, and the second timestamp is used to indicate a time difference between a moment at which the second interface sends the second PTP packet and a moment at which the second interface receives the first PTP packet, and determine the average delay value based on the first timestamp, the second timestamp, and the third timestamp.

In a possible implementation, the first PTP packet is a delay request pdelay_req packet, and the second PTP packet is a delay response pdelay_resp packet.

In a possible implementation, the determining unit is further configured to, if the average delay value is greater than the first threshold, determine that the first fiber link includes the third network device.

In a possible implementation, the first threshold is determined based on a transmission distance of an optical module of the second interface and a transmission delay corresponding to a per-unit transmission distance.

In a possible implementation, the determining unit is further configured to calculate a transmission distance of the first fiber link based on the average delay value, calculate a first receive optical power based on the transmission distance, a transmit optical power of an optical module of the second interface, and an optical signal attenuation coefficient of the optical module, and if an actual optical power of an optical signal received by the first interface is greater than the first receive optical power, and a difference between the actual optical power and the first receive optical power is greater than or equal to the first threshold, determine that the first fiber link includes the third network device.

In a possible implementation, the determining unit is further configured to calculate a delay parameter of the first fiber link based on N average delay values that are obtained within a preset time period, and determine, based on the delay parameter and the first threshold, that the first fiber link includes the third network device.

In a possible implementation, the delay parameter includes any one or more of the following: an average of the N average delay values, a minimum delay packet ratio value, and a fluctuation coefficient of the N average delay values. The minimum delay packet ratio value is a ratio of a first value to N, the first value is a quantity of average delay values whose differences from a minimum average delay value each are less than a second threshold in the N average delay values, and the minimum average delay value is a smallest value of the N average delay values, and the fluctuation coefficient of the N average delay values is used to indicate a fluctuation status of the N average delay values.

In a possible implementation, when the delay parameter is the average of the N average delay values or the fluctuation coefficient of the N average delay values, the determining unit is further configured to, when the delay parameter is greater than the first threshold, determine that the first fiber link includes the third network device.

In a possible implementation, when the delay parameter is the minimum delay packet ratio value, the determining unit is further configured to, when the delay parameter is less than the first threshold, determine that the first fiber link includes the third network device.

According to an eighth aspect, an embodiment of this disclosure provides a fiber link detection apparatus. The apparatus is applied to an optical communications network. The optical communications network includes a first network device and a second network device. A first interface of the first network device communicates with a second interface of the second network device over a first fiber link. The apparatus includes a first determining unit and a second determining unit. The first determining unit is configured to determine that the second interface of the second network device is disabled. The second determining unit is configured to, if the first interface does not determine an optical signal loss of a light source of the second interface within a period of time, or if the first interface does not determine Ethernet linkdown between the second interface and the first interface within a period of time, determine that the first fiber link includes a third network device. The first network device and the second network device support the PTP, and the third network device does not support PTP.

In a possible implementation, duration in which the first interface is disabled is first duration, and the first duration is less than or equal to a first threshold.

In a possible implementation, the apparatus further includes an output unit configured to output a conclusion used to indicate that the first fiber link includes the third network device.

According to a ninth aspect, an embodiment of this disclosure provides a fiber link detection apparatus. The apparatus is applied to an optical communications network. The optical communications network includes a first network device and a second network device. A first interface of the first network device communicates with a second interface of the second network device over a first fiber link. The apparatus includes a first determining unit and a second determining unit. The first determining unit is configured to determine that a rate at which the second interface sends a PTP packet to the first interface over the first fiber link is a first rate. A difference between the first rate and a preset rate is a first difference, and the preset rate is determined based on an Ethernet service processed by the first network device and the second network device. The second determining unit is configured to, if a difference between a second difference and the first difference is greater than or equal to a preset difference, determine that the first fiber link includes a third network device. The first network device and the second network device support PTP, the third network device does not support PTP, and the second difference is a difference between a rate at which the first interface receives a PTP packet and the preset rate.

In a possible implementation, the apparatus further includes an output unit configured to output a conclusion used to indicate that the first fiber link includes the third network device.

According to a tenth aspect, an embodiment of this disclosure provides a fiber link detection apparatus. The apparatus is applied to an optical communications network. The optical communications network includes a first network device and a second network device. A first interface of the first network device communicates with a second interface of the second network device over a first fiber link. The apparatus includes a first determining unit, a second determining unit, and a third determining unit. The first determining unit is configured to determine that a quantity of Ethernet service preambles included in a PTP packet that is sent by the second interface to the first interface over the first fiber link is a first quantity. The second determining unit is configured to determine a second quantity. The second quantity is a quantity of Ethernet service preambles included in a PTP packet that is received by the first interface from the second interface. The third determining unit is configured to, if the first quantity is different from the second quantity, determine that the first fiber link includes a third network device. The first network device and the second network device support PTP, and the third network device does not support PTP.

In a possible implementation, the apparatus further includes an output unit configured to output a conclusion used to indicate that the first fiber link includes the third network device.

According to an eleventh aspect, an embodiment of this disclosure provides a device. The device includes a processor and a memory. The memory is configured to store instructions or a computer program. The processor is configured to execute the instructions or the computer program, to perform the method according to any one of the possible implementations of the first aspect, or the method according to any one of the possible implementations of the second aspect, or the method according to any one of the possible implementations of the third aspect, or the method according to any one of the possible implementations of the fourth aspect, or the method according to any one of the possible implementations of the fifth aspect.

According to a twelfth aspect, an embodiment of this disclosure provides a computer-readable storage medium. The computer-readable storage medium includes instructions or a computer program. When the instructions are run or the computer program is run on a computer, the computer is enabled to perform the method according to any one of the possible implementations of the first aspect, or the method according to any one of the possible implementations of the second aspect, or the method according to any one of the possible implementations of the third aspect, or the method according to any one of the possible implementations of the fourth aspect, or the method according to any one of the possible implementations of the fifth aspect.

According to a thirteenth aspect, an embodiment of this disclosure provides a computer program product including instructions or a computer program. When the computer program product runs on a computer, the computer is enabled to perform the method according to any one of the possible implementations of the first aspect, or the method according to any one of the possible implementations of the second aspect, or the method according to any one of the possible implementations of the third aspect, or the method according to any one of the possible implementations of the fourth aspect, or the method according to any one of the possible implementations of the fifth aspect.

BRIEF DESCRIPTION OF DRAWINGS

To describe the technical solutions in some of the embodiments of this disclosure more clearly, the following briefly describes the accompanying drawings describing some of the embodiments. It is clear that the accompanying drawings in the following descriptions show some embodiments of this disclosure, and persons of ordinary skill in the art may still derive other drawings from these accompanying drawings without creative efforts.

DESCRIPTION OF EMBODIMENTS

Embodiments of this disclosure provide a fiber link detection method and apparatus, to improve an effect of performing time synchronization by using PTP.

Figure 1:
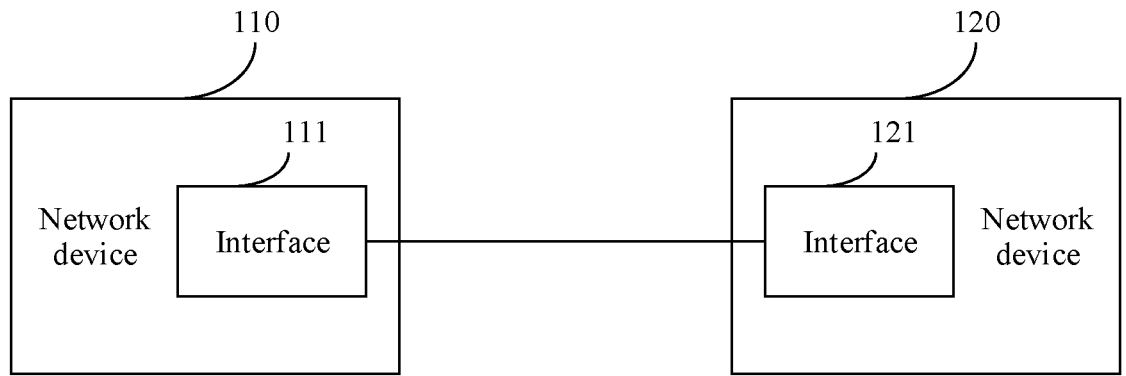
FIG. 1 is a schematic diagram of an example application scenario according to an embodiment of this disclosure.

For ease of understanding, possible application scenarios of embodiments of this disclosure are first described. FIG. 1 is a schematic diagram of an example application scenario according to an embodiment of this disclosure. In the scenario shown in FIG. 1, a network device 110 and a network device 120 may perform time synchronization by using PTP. Further, the network device 110 may send a PTP packet to the network device 120 through an interface 111 of the network device 110, and the network device 120 may receive the PTP packet from the network device 110 through an interface 121 of the network device 120. Correspondingly, the network device 120 may also send a PTP packet to the network device 110 through the interface 121, and the network device 110 may receive the PTP packet from the network device 120 through the interface 111. In an embodiment, the network device 110 may be a master device, and the network device 120 is a slave device. Each time the network device 120 sends a PTP packet to the network device 110, the network device 110 feeds back a PTP packet to the network device 120. The PTP packet fed back by the network device 110 carries a timestamp, and the timestamp is used to indicate a moment at which the network device 110 receives the PTP packet from the network device 120.

Figure 2A:
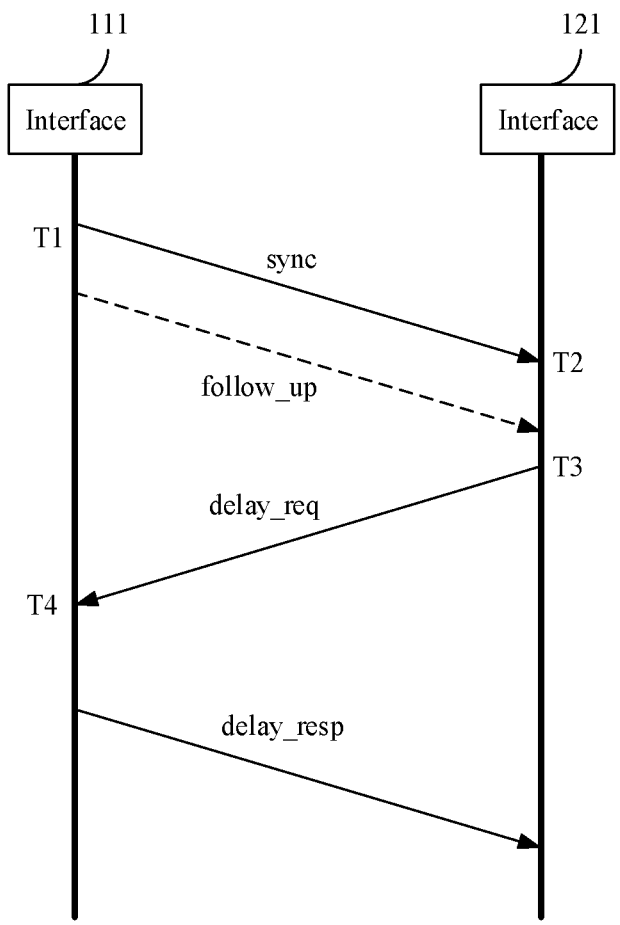
FIG. 2A is a schematic diagram of a clock synchronization scenario according to an embodiment of this disclosure.

For ease of understanding, refer to FIG. 2A. FIG. 2A is a schematic diagram of a clock synchronization scenario according to an embodiment of this disclosure.

In the scenario shown in FIG. 2A, an interface 111 is an interface on a network device 110, an interface 121 is an interface on a network device 120, the network device 110 is a master device, and the network device 120 is a slave device. The network device 110 sends a sync packet to the interface 121. A timestamp T1 is used to indicate a moment at which the interface 111 sends the sync packet to the interface 121. In an embodiment, T1 may be carried in the sync packet. When T1 is carried in the sync packet, T1 is an estimated value of the moment at which the interface 111 sends the sync packet to the interface 121. In another embodiment, the interface 111 may record a timestamp indicating the moment at which the interface 111 sends the sync packet to the interface 121, and send a follow_up packet including the timestamp to the interface 121. The follow_up packet is sent to the interface 121 after the interface 111 sends the sync packet to the interface 121. T2 indicates a timestamp recorded when the interface 121 receives the sync packet, and T2 is used to indicate a moment at which the interface 121 receives the sync packet. The interface 121 may send a delay request (delay_req) packet to the interface 111. T3 indicates a timestamp recorded when the interface 121 sends the delay_req packet to the interface 111, and T3 is used to indicate a moment at which the interface 121 sends the delay_req packet to the interface 111. When receiving the delay_req packet from the interface 121, the interface 111 may record a timestamp T4 of receiving the delay_req packet, add the timestamp T4 to a delay response (delay_resp) packet, and feed back the delay_resp packet to the interface 121. It may be understood that, in the scenario shown in FIG. 2A, the interface 121 serving as a slave device may obtain the foregoing timestamps T1, T2, T3, and T4.

In the scenario shown in FIG. 2A, the network device 120 may adjust local time of the network device 120 based on the foregoing timestamps T1, T2, T3, and T4, so as to implement time synchronization between the device 110 and the device 120.

Figure 2B:
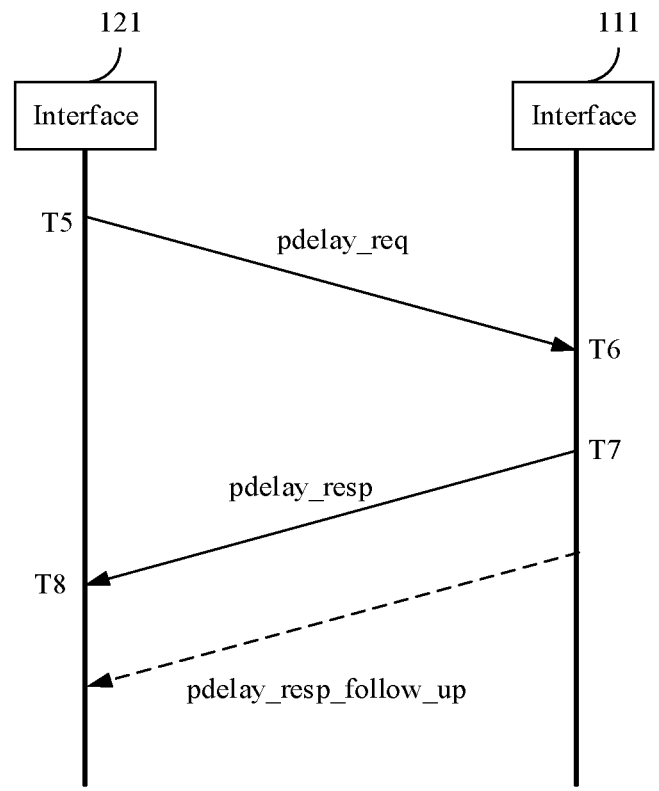
FIG. 2B is a schematic diagram of a clock synchronization scenario according to an embodiment of this disclosure.

FIG. 2B is a schematic diagram of another clock synchronization scenario according to an embodiment of this disclosure. In the scenario shown in FIG. 2B, an interface 121 is an interface on a network device 120, an interface 111 is an interface on a network device 110, the network device 110 is a master device, and the network device 120 is a slave device. The interface 121 may send a delay request (pdelay_req) packet to the interface 111. When sending the pdelay_req packet to the interface 111, the interface 121 may record a timestamp T5 of sending the pdelay_req packet. The timestamp T5 is used to indicate a moment at which the interface 121 sends the pdelay_req packet to the interface 111. When receiving the pdelay_req packet, the interface 111 may record a timestamp T6 of receiving the pdelay_req packet. The timestamp T6 is used to indicate a moment at which the interface 111 receives the pdelay_req packet. Then, the interface 111 may send a delay response (pdelay_resp) packet to the interface 121. When sending the pdelay_resp packet to the interface 121, the interface 111 may record a timestamp T7 of sending the pdelay_resp packet. The timestamp T7 is used to indicate a moment at which the interface 111 sends the pdelay_resp packet to the interface 121. When receiving the pdelay_resp packet, the interface 121 may record a timestamp T8 of receiving the pdelay_resp packet. The timestamp T8 is used to indicate a moment at which the interface 121 receives the pdelay_resp packet.

For the scenario shown in FIG. 2B, in an embodiment, the interface 111 may separately send the timestamp T6 and the timestamp T7 to the interface 121. For example, the interface 111 may send the pdelay_resp packet including the timestamp T6 to the interface 121, and send a delay response follow-up (pdelay_resp_follow_up) packet including the timestamp T7 to the interface 121. The pdelay_resp_follow_up packet is a packet sent by the interface 111 to the interface 121 after the interface 111 sends the pdelay_resp packet to the interface 121. In this case, the interface 121 may obtain the foregoing timestamps T5, T6, T7, and T8.

For the scenario shown in FIG. 2B, in another embodiment, the interface 111 may not separately send the timestamp T6 and the timestamp T7 to the interface 121, but send a difference between the timestamp T7 and the timestamp T6 to the interface 121. For example, the interface 121 may add (T7−T6) to the pdelay_resp packet and send the pdelay_resp packet to the interface 121. For another example, the interface 121 may add (T7−T6) to the pdelay_resp_follow_up packet and send the pdelay_resp_follow_up packet to the interface 121. In this case, the interface 121 may obtain the foregoing timestamps T5, T8, and (T7−T6).

It should be noted that FIG. 2A is shown for ease of understanding. Actually, the interface 111 may periodically send the sync packet to the interface 121, and the interface 121 may also periodically send the delay_req packet to the interface 111. FIG. 2B is shown for ease of understanding. Actually, the interface 121 may periodically send the pdelay_req packet to the interface 111, and the interface 111 sends the pdelay_resp packet to the interface 121 after receiving the pdelay_req packet. The sync packet, the delay_req packet, the follow_up packet, the delay_req packet, the pdelay_resp packet, and the pdelay_resp_follow_up packet in FIG. 2A and FIG. 2B each may be referred to as a PTP packet.

FIG. 2A and FIG. 2B may be applied to a 1588 boundary clock (BC) mode. The 1588 BC mode means that, when two network devices perform time synchronization by using PTP, a PTP packet is transmitted between the two network devices over a fiber link without passing through another device that supports PTP. However, during actual application, a PTP packet transmitted between the network device 110 and the network device 120 may pass through a network device that does not support PTP. In this case, camping time of the PTP packet in the network device that does not support PTP cannot be determined, or the network device that does not support PTP does not terminate PTP packet regeneration. Consequently, time synchronization precision is reduced, in other words, a time synchronization effect is poor. Therefore, it is very important to determine whether a PTP packet passes through a network device that does not support PTP during transmission, so as to help determine reliability of a time synchronization result. Further, when the PTP packet passes through the network device that does not support PTP during transmission, corresponding processing may be performed, so as to improve time synchronization precision. In view of this, embodiments of this disclosure provide fiber link detection methods. The following describes the methods with reference to the accompanying drawings.

The fiber link detection methods provided in embodiments of this disclosure may be applied to a scenario of performing time synchronization by using the 1588 BC mode.

Figure 3:
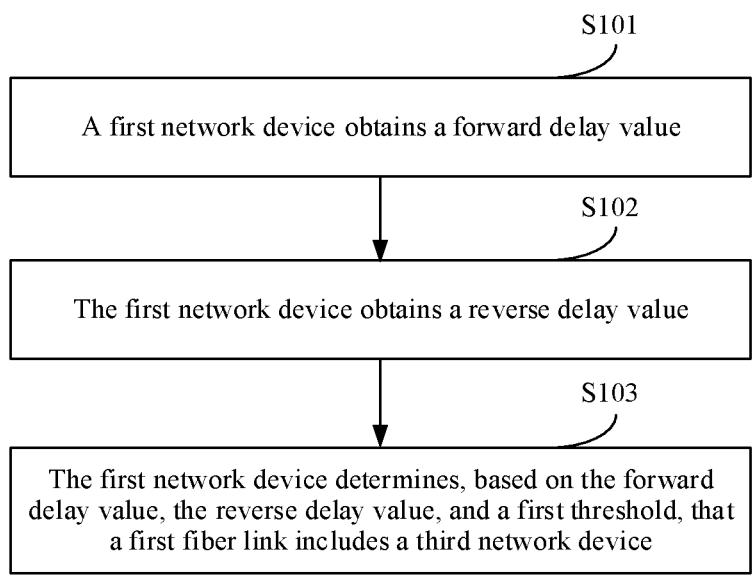
FIG. 3 is a schematic flowchart of a fiber link detection method according to an embodiment of this disclosure.

FIG. 3 is a schematic flowchart of a fiber link detection method according to an embodiment of this disclosure. The fiber link detection method shown in FIG. 3 may be applied to an optical communications network. The optical communications network includes a first network device and a second network device. A first interface of the first network device communicates with a second interface of the second network device over a first fiber link. In this embodiment of this disclosure, the first network device may be a slave device, the second network device may be a master device, both the first network device and the second network device are network devices that support PTP, and the first network device and the second network device may perform time synchronization by using PTP. In this embodiment of this disclosure, the first network device may be the network device 120 shown in FIG. 1, the first interface may be the interface 121 shown in FIG. 1, the second network device may be the network device 110 shown in FIG. 1, and the second interface may be the interface 111 shown in FIG. 1.

The fiber link detection method shown in FIG. 3 may be implemented, for example, by performing S101 to S103.

S101: The first network device obtains a forward delay value.

In this embodiment of this disclosure, the forward delay value is used to indicate a forward delay of transmitting a PTP packet by the second interface to the first interface over the first fiber link. It may be understood that the forward delay value includes a transmission delay of the PTP packet on the first fiber link and a time offset between the first network device and the second network device.

In this embodiment of this disclosure, the first network device may determine the forward delay value by using a first PTP packet. Further, the first network device may obtain a second timestamp and a first timestamp, and determine a difference between the second timestamp and the first timestamp as the forward delay value. The first timestamp is used to indicate a moment at which the second interface sends the first PTP packet to the first interface over the first fiber link, and the second timestamp is used to indicate a moment at which the first interface receives the first PTP packet. In an implementation, the first PTP packet may be, for example, the sync packet shown in FIG. 2A, the first timestamp may be, for example, the timestamp T1 shown in FIG. 2A, and the second timestamp may be the timestamp T2 shown in FIG. 2A. In another implementation, in the scenario shown in FIG. 2B, if the interface 111 may separately send the timestamp T6 and the timestamp T7 to the interface 121, the first PTP packet may alternatively be the pdelay_resp packet. In this case, the first timestamp may correspond to the timestamp T7 in FIG. 2B, and the second timestamp may correspond to the timestamp T8 shown in FIG. 2B.

S102: The first network device obtains a reverse delay value.

In this embodiment of this disclosure, the reverse delay value is used to indicate a reverse delay of transmitting a PTP packet by the first interface to the second interface over the first fiber link. It may be understood that the reverse delay value includes a transmission delay of the PTP packet on the first fiber link and a time offset between the first network device and the second network device.

In this embodiment of this disclosure, the first network device may determine the reverse delay value by using a second PTP packet. Further, the first network device may obtain a third timestamp and a fourth timestamp, and determine a difference between the third timestamp and the fourth timestamp as the reverse delay value. The third timestamp is used to indicate a moment at which the first interface sends the second PTP packet to the second interface over the first fiber link, and the fourth timestamp is used to indicate a moment at which the second interface receives the second PTP packet. In an implementation, the second PTP packet may be, for example, the delay_req packet shown in FIG. 2A, the third timestamp may be, for example, the timestamp T3 shown in FIG. 2A, and the fourth timestamp may be the timestamp T4 shown in FIG. 2A. In another implementation, in the scenario shown in FIG. 2B, if the interface 121 may separately send the timestamp T6 and the timestamp T7 to the interface 111, the second PTP packet may alternatively be the pdelay_req packet. In this case, the third timestamp may correspond to the timestamp T5 in FIG. 2B, and the fourth timestamp may correspond to the timestamp T6 shown in FIG. 2B.

S103: The first network device determines, based on the forward delay value, the reverse delay value, and a first threshold, that the first fiber link includes a third network device.

After determining the forward delay value and the reverse delay value, the first network device may determine, based on the forward delay value and the reverse delay value, an actual delay status of transmitting a PTP packet between the first network device and the second network device, and determine, based on the forward delay value, the reverse delay value, and the first threshold, that the first fiber link includes the third network device that does not support PTP. In this embodiment of this disclosure, the first fiber link may include one or more third network devices. This is not limited in this embodiment of this disclosure. In this embodiment of this disclosure, the third network device does not support PTP. The third network device is not limited in this embodiment of this disclosure. For example, the third network device may be a wavelength division device or a microwave device.

During specific implementation, S103 may be implemented in a plurality of manners. The following describes several possible implementations.

First Implementation:

In this embodiment of this disclosure, after obtaining the forward delay value and the reverse delay value, the first network device may calculate an average delay value of the first fiber link. Further, the first network device may determine an average of the forward delay value and the reverse delay value as the average delay value of the first fiber link. When the average delay value is greater than the first threshold, the first network device determines that the first fiber link includes the third network device that does not support PTP. The first threshold is a maximum delay of transmitting a PTP packet on the first fiber link when the first fiber link includes no other device.

For the optical communications network, the first network device includes an optical module, the optical module includes a light source, and the light source is used to provide an optical signal, so that a PTP packet sent by the first interface can be transmitted over the first fiber link. If the first fiber link does not include the third network device, the first threshold may be determined based on a transmission distance of an optical module of the first interface and a transmission delay corresponding to a per-unit transmission distance. Further, the first threshold may be equal to a product of the transmission distance and the transmission delay corresponding to the per-unit transmission distance. In this case, a controller or a network management device may obtain a transmission distance of an optical module of the second interface and a transmission delay corresponding to a per-unit transmission distance, and calculate a product of the transmission distance and the transmission delay corresponding to the per-unit transmission distance. The controller or the network management device sends the product to the first network device as the first threshold, or the first network device may obtain a type of the optical module of the second interface from the controller or the network management device, to obtain the transmission distance of the optical module of the first interface and the transmission delay corresponding to the per-unit transmission distance, so as to calculate the first threshold.

Second Implementation:

In this embodiment of this disclosure, if the first fiber link does not include the third network device, an optical power received by the first interface is theoretically equal to an optical power sent by the second interface minus an optical power loss on the first fiber link. In view of this, the following steps A to D may be performed to determine that the first fiber link includes the third network device.

Step A: The first network device calculates an average delay value of the first fiber link based on the forward delay value and the reverse delay value.

The first network device may determine an average of the forward delay value and the reverse delay value as the average delay value of the first fiber link.

Step B: The first network device calculates a transmission distance of the first fiber link based on the average delay value.

The first network device may determine a product of the average delay value and a speed of light as the transmission distance of the first fiber link.

Step C: The first network device calculates a first receive optical power based on the transmission distance, a transmit optical power of an optical module of the second interface, and an optical signal attenuation coefficient of the optical module.

After determining the transmission distance, the first network device may obtain an optical power loss on the first fiber link based on the attenuation coefficient of the optical module of the second interface. The first network device may subtract the foregoing optical power loss from the transmit optical power of the optical module of the second interface, to obtain the first receive optical power. The first receive optical power is an optical power theoretically received by the first network device when the first fiber link does not include the third network device.

It should be noted that the first network device may obtain the transmit optical power of the optical module of the second interface and the optical signal attenuation coefficient of the optical module from the controller or the network management device, or the first network device may obtain the transmit optical power of the optical module of the second interface and the optical signal attenuation coefficient of the optical module through a human-computer interaction interface. This is not limited in this embodiment of this disclosure.

Step D: If an actual optical power of an optical signal received by the first interface is greater than the first receive optical power, and a difference between the actual optical power and the first receive optical power is greater than or equal to the first threshold, the first network device determines that the first fiber link includes the third network device.

In this embodiment of this disclosure, if the actual optical power of the optical signal received by the first interface is greater than the first receive optical power, and the difference between the actual optical power and the first receive optical power is greater than or equal to the first threshold, it indicates that the actual optical power received by the first interface is far greater than an optical power theoretically received by the first network device when the first fiber link does not include the third network device. In this case, the first network device may determine that the first fiber link includes the third network device. Because the third network device also has an optical module, the actual optical power of the optical signal received by the first interface is far greater than the first receive optical power.

Third Implementation:

The first network device may calculate a delay parameter of the first fiber link based on N forward delay values and N reverse delay values that are obtained within a preset time period, and determine, based on the delay parameter of the first fiber link and the first threshold, that the first fiber link includes the third network device.

The preset time period is not limited in this embodiment of this disclosure. The preset time period may be, for example, a time period whose duration is 1 s. As described above, the network device 110 may periodically send the sync packet to the network device 120, and the network device 120 may also periodically send the delay_req packet to the network device 110. The interface 121 may periodically send the pdelay_req packet to the interface 111, and the interface 111 may also periodically send the pdelay_resp packet to the interface 121. Therefore, the first network device may obtain the N forward delay values and the N reverse delay values within the preset time period. For example, if the network device 110 periodically sends a sync packet to the network device 120 every ¹⁄₁₆s, the first network device may obtain 16 forward delay values based on 16 sync packets received within 1 s. Likewise, if the network device 120 periodically sends a delay_req packet to the network device 110 every ¹⁄₁₆s, the first network device may obtain 16 reverse delay values based on 16 delay_req packets received within 1 s.

It may be understood that, for the N forward delay values and the N reverse delay values, one average delay value may be determined based on one forward delay value and one reverse delay value, and therefore N average delay values may be determined based on the N forward delay values and the N reverse delay values. In addition, one time offset may be determined based on one forward delay value and one reverse delay value. The time offset may be calculated by using the following formula (1):

$$\text{offset} = [(T4-T3)-(T2-T1)]/2. \qquad \text{Formula (1)}$$

In the formula (1), "offset" is the time offset between the first network device and the second network device, "T4−T3" is the reverse delay value, and "T2−T1" is the forward delay value.

In this embodiment of this disclosure, the delay parameter of the first fiber link is a parameter that can reflect a delay of the first fiber link. The delay parameter of the first fiber link is not limited in this embodiment of this disclosure. An average of the foregoing N average delays, an average of the foregoing N time offsets, a fluctuation status of the foregoing N average delays, a peak-to-peak value of the foregoing N forward delays, a peak-to-peak value of the foregoing N reverse delays, and a minimum delay packet ratio each may reflect the delay of the first fiber link. Therefore, the delay parameter may include any one or more of the following: the average of the N average delay values, the peak-to-peak value of the N forward delay values, the peak-to-peak value of the N reverse delay values, the average of the N time offsets, the minimum delay packet ratio value, and a fluctuation coefficient of the N average delay values. The fluctuation coefficient of the N average delay values may be used to indicate the fluctuation status of the N average delay values.

For the average of the N average delays, it should be noted that, if the first fiber link does not include the third network device, the average of the N average delays theoretically should not be greater than the first threshold. The first threshold is a maximum value of a corresponding average delay of transmitting a PTP packet between the first network device and the second network device when the first fiber link does not include the third network device. The first threshold may be an empirical value. Therefore, if the delay parameter of the first fiber link is the average of the N average delays, for example, when the average of the N average delays is greater than the first threshold, the first network device may determine that the first fiber link includes the third network device.

For the average of the N time offsets, it should be noted that, if the first fiber link does not include the third network device, the average of the N time offsets theoretically should not be greater than the first threshold. The first threshold is a maximum value of a time offset obtained by transmitting a PTP packet between the first network device and the second network device when the first fiber link does not include the third network device. The first threshold may be an empirical value. Therefore, if the delay parameter of the first fiber link is the average of the N time offsets, for example, when the average of the N time offsets is greater than the first threshold, the first network device may determine that the first fiber link includes the third network device.

For the peak-to-peak value of the N forward delay values, it should be noted that, if the first fiber link does not include the third network device, the peak-to-peak value of the N forward delay values is usually not very large, in other words, is usually not greater than the first threshold. The first threshold may be, for example, an empirical value. Therefore, if the delay parameter of the first fiber link is the peak-to-peak value of the N forward delays, for example, when the peak-to-peak value of the N forward delay values is greater than the first threshold, the first network device may determine that the first fiber link includes the third network device. The peak-to-peak value of the N forward delays is a difference between a largest value and a smallest value in the N forward delay values.

Similarly, if the first fiber link does not include the third network device, the peak-to-peak value of the N reverse delay values is usually not very large, in other words, is usually not greater than the first threshold. The first threshold may be, for example, an empirical value. Therefore, if the delay parameter of the first fiber link is the peak-to-peak value of the N reverse delays, for example, when the peak-to-peak value of the N reverse delay values is greater than the first threshold, the first network device may determine that the first fiber link includes the third network device. The peak-to-peak value of the N reverse delays is a difference between a largest value and a smallest value in the N reverse delay values.

For the fluctuation coefficient of the N average delay values, it should be noted that the fluctuation coefficient may be, for example, a variance of the N average delay values, or may be, for another example, a standard deviation of the N average delay values. It may be understood that, if the first fiber link does not include the third network device, the N average delay values theoretically should be very close, in other words, the N average delay values slightly fluctuate. Therefore, if the delay parameter of the first fiber link is the fluctuation coefficient of the N average delay values, and the fluctuation coefficient of the N average delay values is greater than the first threshold, the first network device may determine that the first fiber link includes the third network device. The first threshold mentioned herein may be an empirical value.

For the minimum delay packet ratio, it should be noted that the minimum delay packet ratio is a ratio of a first value to N, and the first value is a quantity of average delay values whose differences from a minimum average delay value each are less than a second threshold in the N average delay values. The second threshold is a relatively small value. Alternatively, a ratio of the second threshold to the minimum average delay value is relatively small. For example, the second threshold may be 5% of the minimum average delay value. A minimum delay value is a smallest value of the N average delay values. For example, if N=16, the minimum delay value is 100 ns, and 15 average delay values in the 16 minimum delay values each are less than 105 ns, the minimum delay packet ratio is 15/16=93.75%. During actual application, if the first fiber link does not include the third network device, the minimum delay packet ratio is relatively large, and is usually greater than 90%. Therefore, if the delay parameter of the first fiber link is the minimum delay packet ratio, and the minimum delay packet ratio is less than the first threshold, the first network device may determine that the first fiber link includes the third network device. In this case, the first threshold may be, for example, 90%.

It can be learned from the foregoing descriptions that, according to the solution in this embodiment of this disclosure, it may be determined whether the first fiber link includes the third network device. Correspondingly, when it is determined that the first fiber link includes the third network device, corresponding processing may be further performed, so as to improve time synchronization precision.

Figure 4:
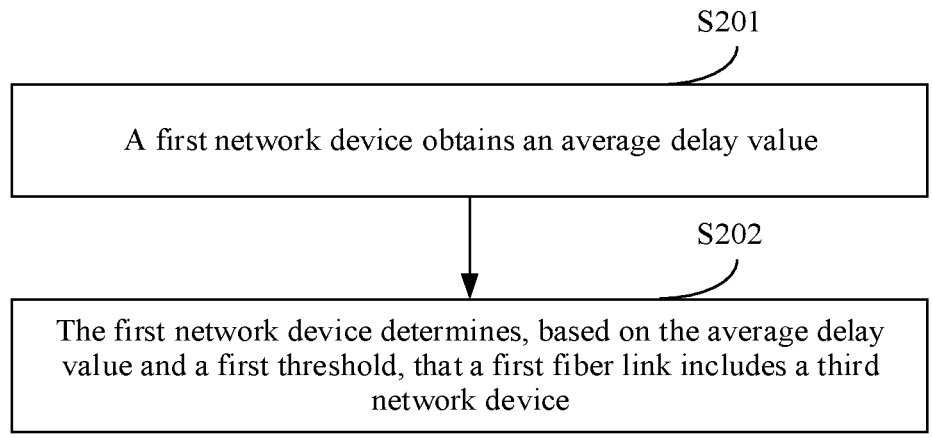
FIG. 4 is a schematic flowchart of another fiber link detection method according to an embodiment of this disclosure.

FIG. 4 is a schematic flowchart of another fiber link detection method according to an embodiment of this disclosure. The fiber link detection method shown in FIG. 4 is the same as the fiber link detection method shown in FIG. 3. The method shown in FIG. 4 may also be applied to an optical communications network. The optical communications network includes a first network device and a second network device. A first interface of the first network device communicates with a second interface of the second network device over a first fiber link. In this embodiment of this disclosure, the first network device may be a slave device, the second network device may be a master device, both the first network device and the second network device are network devices that support PTP, and the first network device and the second network device may perform time synchronization by using PTP. In this embodiment of this disclosure, the first network device may be the network device 120 shown in FIG. 1, the first interface may be the interface 121 shown in FIG. 1, the second network device may be the network device 110 shown in FIG. 1, and the second interface may be the interface 111 shown in FIG. 1. Different from the fiber link detection method shown in FIG. 3, the method shown in FIG. 4 may be applied to the scenario in FIG. 2B in which the interface 121 may obtain the timestamps T5, T8, and (T7−T6).

The method shown in FIG. 4 may be implemented by performing S201 and S202.

S201: The first network device obtains an average delay value.

In this embodiment of this disclosure, the average delay value is used to indicate an average of a delay of transmitting a PTP packet by the first interface over the first fiber link and a delay of transmitting a PTP packet by the second interface over the first fiber link.

In this embodiment of this disclosure, the first network device may determine the average delay value based on a first PTP packet and a second PTP packet that are transmitted between the first interface and the second interface. Further, the first network device may obtain a first timestamp, a second timestamp, and a third timestamp. The first timestamp is used to indicate a moment at which the first interface sends the first PTP packet to the second interface over the first fiber link, the third timestamp is used to indicate a moment at which the first interface receives the second PTP packet sent by the second interface over the first fiber link, and the second timestamp is used to indicate a time difference between a moment at which the second interface sends the second PTP packet and a moment at which the second interface receives the first PTP packet. With reference to the scenario shown in FIG. 2B, the first PTP packet may be the pdelay_req packet, the first timestamp is the timestamp T5 shown in FIG. 2B, the second packet is the pdelay_resp packet, the third timestamp is the timestamp T8 shown in FIG. 2B, and the second timestamp is the timestamp (T7−T6).

After obtaining the first timestamp, the second timestamp, and the third timestamp, the first network device may calculate the average delay value by using the following formula (2):

$$\text{pathdelay} = [(T8-T5)-(T7-T6)]/2, \quad \text{Formula (2)}$$

where "pathdelay" is the average delay value, T5 is the first timestamp, T8 is the third timestamp, and (T7−T6) is the second timestamp.

S202: The first network device determines, based on the average delay value and a first threshold, that the first fiber link includes a third network device.

The average delay value may be used to determine an actual delay status of transmitting a PTP packet between the first network device and the second network device. Therefore, the first network device may determine, based on the average delay value and the first threshold, that the first fiber link includes the third network device that does not support PTP.

Similar to S103, S202 may also be implemented in a plurality of manners. The following describes three possible implementations.

First Implementation:

In this embodiment of this disclosure, when the average delay value is greater than the first threshold, the first network device determines that the first fiber link includes the third network device that does not support PTP. The first threshold is a maximum delay of transmitting a PTP packet on the first fiber link when the first fiber link includes no other device.

In this case, the first threshold may be determined based on a transmission distance of an optical module of the second interface and a transmission delay corresponding to a per-unit transmission distance. For a specific manner of determining the first threshold, refer to the related descriptions in the first implementation of S103. Details are not described herein again.

Second Implementation:

In this embodiment of this disclosure, if the first fiber link does not include the third network device, an optical power received by the first interface is theoretically equal to an optical power sent by the second interface minus an optical power loss on the first fiber link. In view of this, the following steps B to D may be performed to determine that the first fiber link includes the third network device.

Step B: The first network device calculates a transmission distance of the first fiber link based on the average delay value.

Step C: The first network device calculates a first receive optical power based on the transmission distance, a transmit optical power of an optical module of the second interface, and an optical signal attenuation coefficient of the optical module.

Step D: If an actual optical power of an optical signal received by the first interface is greater than the first receive optical power, and a difference between the actual optical power and the first receive optical power is greater than or equal to the first threshold, the first network device determines that the first fiber link includes the third network device.

For specific implementations of steps B to D, refer to the descriptions of steps B to D in the second implementation of S103. Details are not described herein again.

Third Implementation:

The first network device may calculate a delay parameter of the first fiber link based on N average delay values that are obtained within a preset time period, and determine, based on the delay parameter of the first fiber link and the first threshold, that the first fiber link includes the third network device.

The preset time period is not limited in this embodiment of this disclosure. The preset time period may be, for example, a time period whose duration is 1 s.

In this embodiment of this disclosure, the delay parameter of the first fiber link is a parameter that can reflect a delay of the first fiber link. The delay parameter of the first fiber link is not limited in this embodiment of this disclosure. An average of the N average delay values, a minimum delay packet ratio value, and a fluctuation coefficient of the N average delay values each may reflect the delay of the first fiber link. Therefore, the delay parameter may include any one or more of the following: the average of the N average delay values, the minimum delay packet ratio value, and the fluctuation coefficient of the N average delay values.

In this embodiment of this disclosure, when the delay parameter is the average of the N average delay values or the fluctuation coefficient of the N average delay values, and when the delay parameter is greater than the first threshold, the first network device may determine that the first fiber link includes the third network device. When the delay parameter is the minimum delay packet ratio value, and when the delay parameter is less than the first threshold, the first network device may determine that the first fiber link includes the third network device.

For the average of the N average delays, the minimum delay packet ratio value, and the fluctuation coefficient of the N average delay values, refer to the specific descriptions of the third implementation of S103. Details are not described herein again.

It can be learned from the foregoing descriptions that, according to the solution in this embodiment of this disclosure, it may be determined whether the first fiber link includes the third network device. Correspondingly, when it is determined that the first fiber link includes the third network device, corresponding processing may be further performed, for example, reporting to a network management system is performed and network management personnel perform processing in time, so as to improve time synchronization precision.

Figure 5:
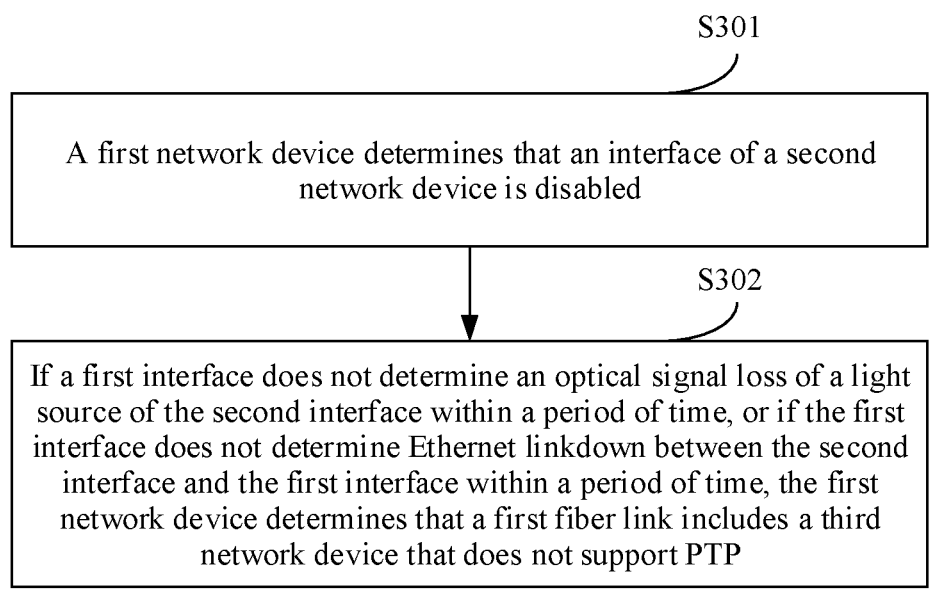
FIG. 5 is a schematic flowchart of another fiber link detection method according to an embodiment of this disclosure.

FIG. 5 is a schematic flowchart of another fiber link detection method according to an embodiment of this disclosure. Same as the fiber link detection method shown in FIG. 3, the method shown in FIG. 5 may also be applied to an optical communications network. The optical communications network includes a first network device and a second network device. A first interface of the first network device communicates with a second interface of the second network device over a first fiber link. In this embodiment of this disclosure, the first network device may be a slave device, the second network device may be a master device, both the first network device and the second network device are network devices that support PTP, and the first network device and the second network device may perform time synchronization by using PTP. In this embodiment of this disclosure, the first network device may be the network device 120 shown in FIG. 1, the first interface may be the interface 121 shown in FIG. 1, the second network device may be the network device 110 shown in FIG. 1, and the second interface may be the interface 111 shown in FIG. 1.

The method shown in FIG. 5 may be implemented by performing S301 and S302.

S301: The first network device determines that the second interface of the second network device is disabled.

S302: If the first interface does not determine an optical signal loss of a light source of the second interface within a period of time, or if the first interface does not determine Ethernet linkdown between the second interface and the first interface within a period of time, the first network device determines that the first fiber link includes a third network device that does not support PTP.

For S301 and S302, it should be noted that, if the first fiber link does not include the third network device that does not support PTP, after the second interface is disabled, the first interface detects an optical signal loss (LOS) signal and an Ethernet linkdown signal within a short period of time. Therefore, after the second interface is disabled, if the first interface does not detect the LOS signal or the linkdown signal within a period of time, it may indicate that the first fiber link includes the third network device.

In this embodiment of this disclosure, the first network device may determine, by using a controller or a network management system, that the second interface is disabled. For example, the controller or the network management system controls the second interface to be disabled, and notifies the first network device that the second interface is disabled. The first network device may alternatively determine, in another manner, that the second interface is disabled. For example, the first network device determines, through a human-computer interaction interface, that the second interface is disabled. This is not limited in this embodiment of this disclosure.

In some embodiments, if the second interface is disabled for a long period of time, the first interface still detects the LOS signal and the linkdown signal after a period of time. In addition, if the second interface is disabled for a long period of time, normal communication between the first interface and the second interface is also affected. Therefore, in an implementation of this embodiment of this disclosure, duration in which the first interface is disabled is first duration. The first duration is less than or equal to a first threshold. This can ensure accuracy of a determining result of S202, and prevent normal communication between the first interface and the second interface from being affected as much as possible.

In some embodiments, after determining that the first fiber link includes the third network device, the first network device may further output a conclusion used to indicate that the first fiber link includes the third network device. The output includes but is not limited to controlling display of a display device, controlling play of a voice play device, controlling print of a print device, and the like. The display device mentioned herein is, for example, a display, the voice play device mentioned herein is, for example, a speaker, and the print device mentioned herein is, for example, a printer. For example, when the first network device determines that the first fiber link includes the third network device, the first network device may also output alarm information. Management personnel may perform processing in time based on the alarm information, so as to improve time synchronization precision. Alternatively, the first network device may report the information to a network management system, so that network management personnel can perform processing in time, so as to improve time synchronization precision.

Figure 6:
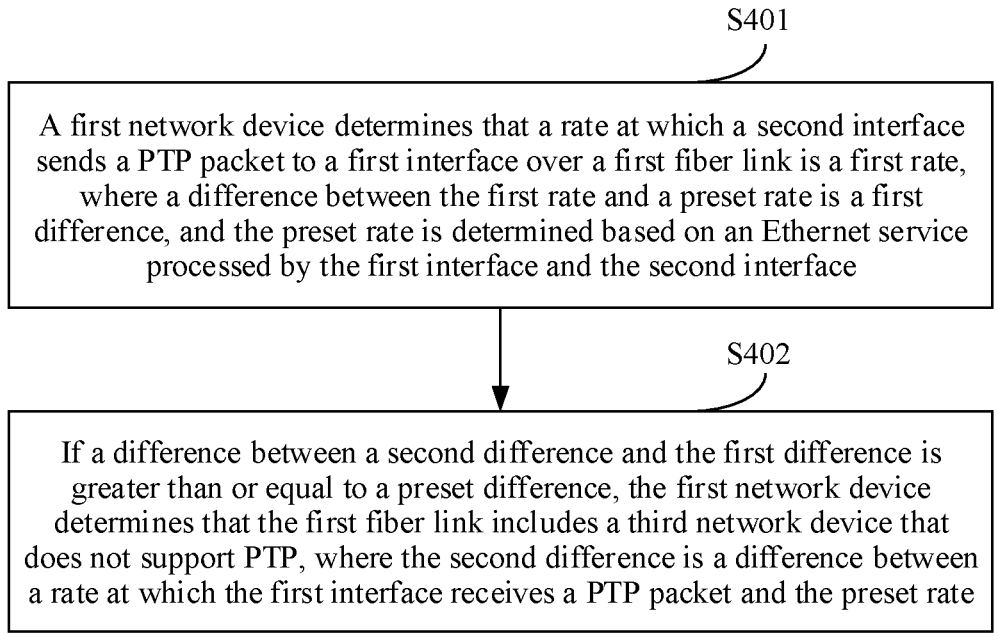
FIG. 6 is a schematic flowchart of another fiber link detection method according to an embodiment of this disclosure.

FIG. 6 is a schematic flowchart of another fiber link detection method according to an embodiment of this disclosure. Same as the fiber link detection method shown in FIG. 3, the method shown in FIG. 6 may also be applied to an optical communications network. The optical communications network includes a first network device and a second network device. A first interface of the first network device communicates with a second interface of the second network device over a first fiber link. In this embodiment of this disclosure, the first network device may be a slave device, the second network device may be a master device, both the first network device and the second network device are network devices that support PTP, and the first network device and the second network device may perform time synchronization by using PTP. In this embodiment of this disclosure, the first network device may be the network device 120 shown in FIG. 1, the first interface may be the interface 121 shown in FIG. 1, the second network device may be the network device 110 shown in FIG. 1, and the second interface may be the interface 111 shown in FIG. 1.

The method shown in FIG. 6 may be implemented by performing S401 and S402.

S401: The first network device determines that a rate at which the second interface sends a PTP packet to the first interface over the first fiber link is a first rate, where a difference between the first rate and a preset rate is a first difference, and the preset rate is determined based on an Ethernet service processed by the first interface and the second interface.

S402: If a difference between a second difference and the first difference is greater than or equal to a preset difference, the first network device determines that the first fiber link includes a third network device that does not support PTP, where the second difference is a difference between a rate at which the first interface receives a PTP packet and the preset rate.

For S401 and S402, it should be noted that, in this embodiment of this disclosure, the preset rate at which the second interface sends a message to the first interface is determined based on an Ethernet service processed by the first network device and the second device. Generally, if a PTP packet transmitted between the first interface and the second interface does not pass through a device that does not support PTP, the difference between the rate at which the first interface receives a PTP packet and the preset rate is theoretically equal to the difference between the first rate and the preset rate. For example, if the difference between the first rate and the preset rate is the first difference, the difference between the rate at which the first interface receives a PTP packet and the preset rate is theoretically not much different from the first difference. However, if a PTP packet transmitted between the first interface and the second interface passes through a device that does not support PTP, the difference between the rate at which the first interface receives a PTP packet and the preset rate may be greatly different from the difference between the first rate and the preset rate. The foregoing device that does not support PTP, for example, a wavelength division device, may modify a rate of a PTP packet. For example, the wavelength division device may modify a quantity of invalid bits in the PTP packet to modify a quantity of bits transmitted per unit time, so as to change the rate of the PTP packet.

In view of this, in this embodiment of this disclosure, if the difference between the second difference and the first difference is greater than or equal to the preset difference, in other words, the second difference is greatly different from the first difference, the first network device may determine that the first fiber link includes the third network device.

In this embodiment of this disclosure, the first network device may determine, by using a controller or a network management system, that the rate at which the second interface sends a PTP packet to the first interface over the first fiber link is the first rate, or the first network device may determine, through a human-computer interaction interface, that the rate at which the second interface sends a PTP packet to the first interface over the first fiber link is the first rate. This is not further limited in this embodiment of this disclosure.

The PTP packet mentioned in S401 and S402 may be the sync packet, the delay_req packet, the follow_up packet, the delay_req packet, the pdelay_resp packet, or the pdelay_resp_follow_up packet in FIG. 2A and FIG. 2B, or may be a packet that is not shown in FIG. 2A and FIG. 2B. This is not limited herein.

In some embodiments, after determining that the first fiber link includes the third network device, the first network device may further output a conclusion used to indicate that the first fiber link includes the third network device. Management personnel may perform processing in time based on output content, so as to improve time synchronization precision.

Figure 7:
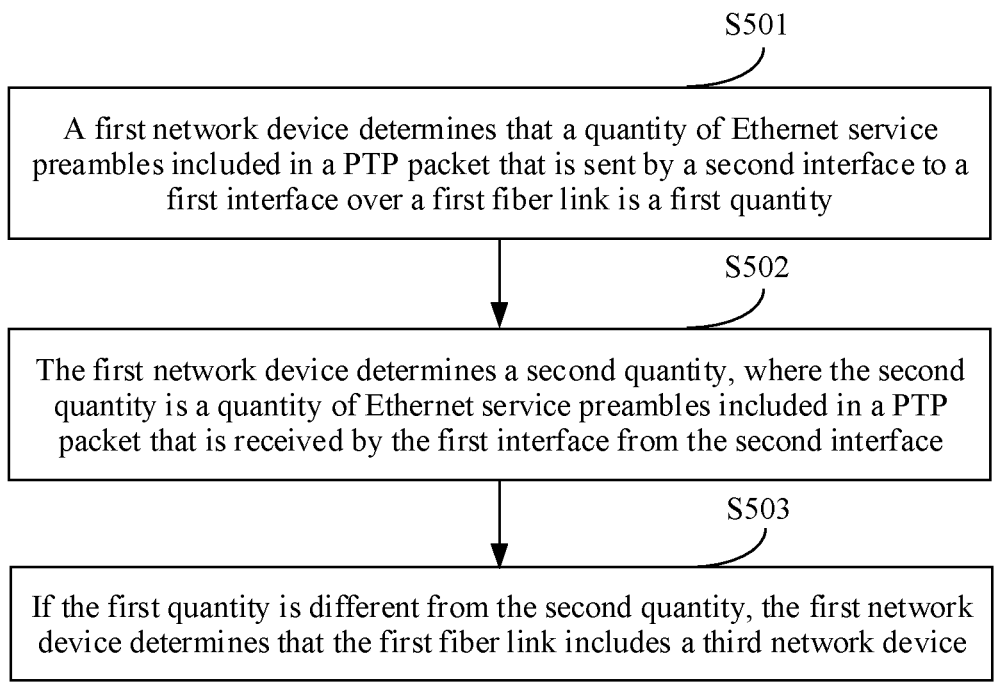
FIG. 7 is a schematic flowchart of another fiber link detection method according to an embodiment of this disclosure.

FIG. 7 is a schematic flowchart of another fiber link detection method according to an embodiment of this disclosure. Same as the fiber link detection method shown in FIG. 3, the method shown in FIG. 7 may also be applied to an optical communications network. The optical communications network includes a first network device and a second network device. A first interface of the first network device communicates with a second interface of the second network device over a first fiber link. In this embodiment of this disclosure, the first network device may be a slave device, the second network device may be a master device, both the first network device and the second network device are network devices that support PTP, and the first network device and the second network device may perform time synchronization by using PTP. In this embodiment of this disclosure, the first network device may be the network device 120 shown in FIG. 1, the first interface may be the interface 121 shown in FIG. 1, the second network device may be the network device 110 shown in FIG. 1, and the second interface may be the interface 111 shown in FIG. 1.

The method shown in FIG. 7 may be implemented by performing S501 to S503.

S501: The first network device determines that a quantity of Ethernet service preambles included in a PTP packet that is sent by the second interface to the first interface over the first fiber link is a first quantity.

S502: The first network device determines a second quantity, where the second quantity is a quantity of Ethernet service preambles included in a PTP packet that is received by the first interface from the second interface.

S503: If the first quantity is different from the second quantity, the first network device determines that the first fiber link includes a third network device.

For S501 and S502, it should be noted that the PTP packet sent by the second interface to the first interface may carry an Ethernet service preamble. There may be different quantities of Ethernet service preambles. Currently, there may be six or seven Ethernet service preambles. If the PTP packet sent by the second interface to the first interface passes through a network device that does not support PTP, the network device that does not support PTP may modify the quantity of Ethernet service preambles. In view of this, if the quantity of Ethernet service preambles included in the PTP packet received by the first interface is different from the quantity of Ethernet service preambles included in the PTP packet sent by the second interface, in other words, the second quantity is different from the first quantity, it indicates that the Ethernet service preambles are modified, so that the first network device can determine that the first fiber link includes the third network device.

In this embodiment of this disclosure, the first network device may determine the first quantity by using a controller or a network management device, or may determine the first quantity through a human-computer interaction interface. This is not limited in this embodiment of this disclosure.

In this embodiment of this disclosure, after receiving the PTP packet, the first interface may parse the PTP packet to determine the second quantity.

The PTP packet mentioned in S501 and S502 may be the sync packet, the delay_req packet, the follow_up packet, the delay_req packet, the pdelay_resp packet, or the pdelay_resp_follow_up packet in FIG. 2A and FIG. 2B, or may be a packet that is not shown in FIG. 2A and FIG. 2B. This is not limited herein.

In some embodiments, after determining that the first fiber link includes the third network device, the first network device may further output a conclusion used to indicate that the first fiber link includes the third network device. Management personnel may perform processing in time based on output content, so as to improve time synchronization precision.

According to the fiber link detection methods provided in embodiments above, embodiments of this disclosure further provide corresponding apparatuses. The following describes the apparatuses provided in embodiments of this disclosure with reference to the accompanying drawings.

Figure 8:
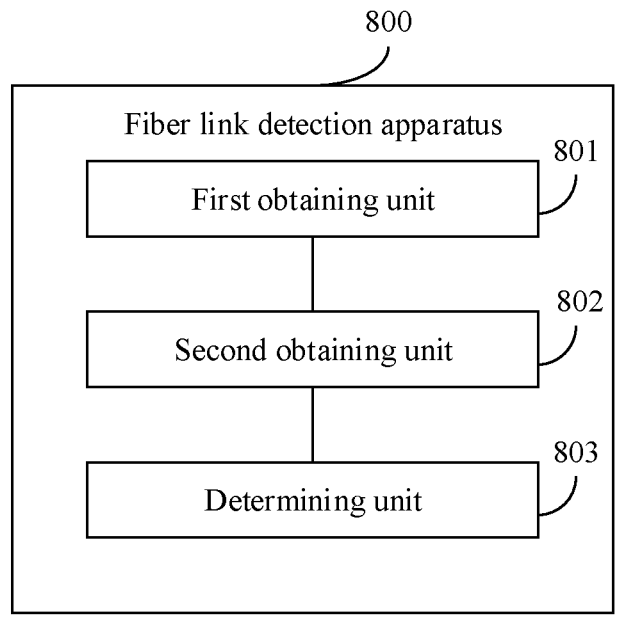
FIG. 8 is a schematic diagram of a structure of a fiber link detection apparatus according to an embodiment of this disclosure.

FIG. 8 is a schematic diagram of a structure of a fiber link detection apparatus according to an embodiment of this disclosure. The fiber link detection apparatus 800 shown in FIG. 8 may be applied to an optical communications network. The optical communications network includes a first network device and a second network device. A first interface of the first network device communicates with a second interface of the second network device over a first fiber link. Further, the apparatus 800 may be applied to the first network device mentioned in the foregoing embodiment, and is configured to perform the fiber link detection method performed by the first network device shown in FIG. 3. The apparatus 800 may further include, for example, a first obtaining unit 801, a second obtaining unit 802, and a determining unit 803.

The first obtaining unit 801 is configured to obtain a forward delay value. The forward delay value is used to indicate a forward delay of transmitting a PTP packet by the second interface to the first interface over the first fiber link.

The second obtaining unit 802 is configured to obtain a reverse delay value. The reverse delay value is used to indicate a reverse delay of transmitting a PTP packet by the first interface to the second interface over the first fiber link.

The determining unit 803 is configured to determine, based on the forward delay value, the reverse delay value, and a first threshold, that the first fiber link includes a third network device. The first network device and the second network device support PTP, and the third network device does not support PTP.

In an implementation, the first obtaining unit 801 is further configured to obtain a second timestamp and a first timestamp, and determine a difference between the second timestamp and the first timestamp as the forward delay value. The first timestamp is used to indicate a moment at which the second interface sends a first PTP packet to the first interface over the first fiber link, and the second timestamp is used to indicate a moment at which the first interface receives the first PTP packet.

The second obtaining unit 802 is further configured to obtain a third timestamp and a fourth timestamp, and determine a difference between the fourth timestamp and the third timestamp as the reverse delay value. The third timestamp is used to indicate a moment at which the first interface sends a second PTP packet to the second interface over the first fiber link, and the fourth timestamp is used to indicate a moment at which the second interface receives the second PTP packet.

In an implementation, the first PTP packet is a synchronization sync packet, and the second PTP packet is a delay request delay_req packet, or the first PTP packet is a delay response pdelay_resp packet, and the second PTP packet is a delay request pdelay_req packet.

In an implementation, the determining unit 803 is further configured to calculate an average delay value of the first fiber link based on the forward delay value and the reverse delay value, and if the average delay value is greater than the first threshold, determine that the first fiber link includes the third network device.

In an implementation, the first threshold is determined based on a transmission distance of an optical module of the second interface and a transmission delay corresponding to a per-unit transmission distance.

In an implementation, the determining unit 803 is further configured to calculate an average delay value of the first fiber link based on the forward delay value and the reverse delay value, calculate a transmission distance of the first fiber link based on the average delay value, calculate a first receive optical power based on the transmission distance, a transmit optical power of an optical module of the second interface, and an optical signal attenuation coefficient of the optical module, and if an actual optical power of an optical signal received by the first interface is greater than the first receive optical power, and a difference between the actual optical power and the first receive optical power is greater than or equal to the first threshold, determine that the first fiber link includes the third network device.

In an implementation, the determining unit 803 is further configured to calculate a delay parameter of the first fiber link based on N forward delay values and N reverse delay values that are obtained within a preset time period, and determine, based on the delay parameter and the first threshold, that the first fiber link includes the third network device.

In an implementation, the delay parameter includes any one or more of the following: an average of N average delay values, a peak-to-peak value of the N forward delay values, a peak-to-peak value of the N reverse delay values, an average of N time offsets, a minimum delay packet ratio value, and a fluctuation coefficient of the N average delay values. The average delay value is an average of the forward delay value and the reverse delay value, and one forward delay value and one reverse delay value correspond to one average delay value, the time offset is calculated based on a difference between the reverse delay value and the forward delay value, and one forward delay value and one reverse delay value correspond to one time offset, the minimum delay packet ratio value is a ratio of a first value to N, the first value is a quantity of average delay values whose differences from a minimum average delay value each are less than a second threshold in the N average delay values, and the minimum average delay value is a smallest value of the N average delay values, and the fluctuation coefficient of the N average delay values is used to indicate a fluctuation status of the N average delay values.

In an implementation, when the delay parameter is the average of the N average delay values, or the peak-to-peak value of the N forward delay values, or the peak-to-peak value of the N reverse delay values, or the average of the N time offsets, or the fluctuation coefficient of the N average delay values, the determining unit 803 is further configured to, when the delay parameter is greater than the first threshold, determine that the first fiber link includes the third network device.

In an implementation, when the delay parameter is the minimum delay packet ratio value, the determining unit 803 is further configured to, when the delay parameter is less than the first threshold, determine that the first fiber link includes the third network device.

The apparatus 800 is an apparatus corresponding to the method in FIG. 3 that is provided in the foregoing method embodiment, and a specific implementation of each unit of the apparatus 800 has a same concept as the foregoing method embodiment. Therefore, for the specific implementation of each unit of the apparatus 800, refer to the descriptions of FIG. 3 in the foregoing method embodiment. Details are not described herein again.

Figure 9:
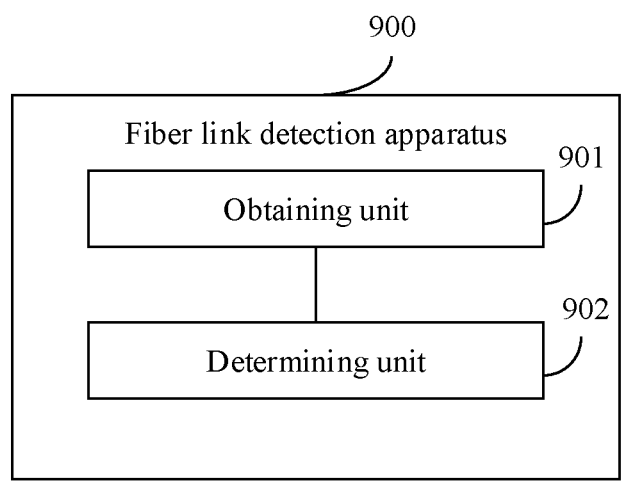
FIG. 9 is a schematic diagram of a structure of a fiber link detection apparatus according to an embodiment of this disclosure.

FIG. 9 is a schematic diagram of a structure of a fiber link detection apparatus according to an embodiment of this disclosure. The fiber link detection apparatus 900 shown in FIG. 9 may be applied to an optical communications network. The optical communications network includes a first network device and a second network device. A first interface of the first network device communicates with a second interface of the second network device over a first fiber link. Further, the apparatus 900 may be applied to the first network device mentioned in the foregoing embodiment, and is configured to perform the fiber link detection method performed by the first network device shown in FIG. 4. The apparatus 900 may further include, for example, an obtaining unit 901 and a determining unit 902.

The obtaining unit 901 is configured to obtain an average delay value. The average delay value is used to indicate an average of a delay of transmitting a PTP packet by the first interface over the first fiber link and a delay of transmitting a PTP packet by the second interface over the first fiber link.

The determining unit 902 is configured to determine, based on the average delay value and a first threshold, that the first fiber link includes a third network device. The first network device and the second network device support PTP, and the third network device does not support PTP.

In an implementation, the obtaining unit 901 is further configured to obtain a first timestamp, a second timestamp, and a third timestamp, where the first timestamp is used to indicate a moment at which the first interface sends a first PTP packet to the second interface over the first fiber link, the third timestamp is used to indicate a moment at which the first interface receives a second PTP packet sent by the second interface over the first fiber link, and the second timestamp is used to indicate a time difference between a moment at which the second interface sends the second PTP packet and a moment at which the second interface receives the first PTP packet, and determine the average delay value based on the first timestamp, the second timestamp, and the third timestamp.

In an implementation, the first PTP packet is a delay request pdelay_req packet, and the second PTP packet is a delay response pdelay_resp packet.

In an implementation, the determining unit 902 is further configured to, if the average delay value is greater than the first threshold, determine that the first fiber link includes the third network device.

In an implementation, the first threshold is determined based on a transmission distance of an optical module of the second interface and a transmission delay corresponding to a per-unit transmission distance.

In an implementation, the determining unit 902 is further configured to calculate a transmission distance of the first fiber link based on the average delay value, calculate a first receive optical power based on the transmission distance, a transmit optical power of an optical module of the second interface, and an optical signal attenuation coefficient of the optical module, and if an actual optical power of an optical signal received by the first interface is greater than the first receive optical power, and a difference between the actual optical power and the first receive optical power is greater than or equal to the first threshold, determine that the first fiber link includes the third network device.

In an implementation, the determining unit 902 is further configured to calculate a delay parameter of the first fiber link based on N average delay values that are obtained within a preset time period, and determine, based on the delay parameter and the first threshold, that the first fiber link includes the third network device.

In an implementation, the delay parameter includes any one or more of the following: an average of the N average delay values, a minimum delay packet ratio value, and a fluctuation coefficient of the N average delay values. The minimum delay packet ratio value is a ratio of a first value to N, the first value is a quantity of average delay values whose differences from a minimum average delay value each are less than a second threshold in the N average delay values, and the minimum average delay value is a smallest value of the N average delay values, and the fluctuation coefficient of the N average delay values is used to indicate a fluctuation status of the N average delay values.

In an implementation, when the delay parameter is the average of the N average delay values or the fluctuation coefficient of the N average delay values, the determining unit 902 is further configured to, when the delay parameter is greater than the first threshold, determine that the first fiber link includes the third network device.

In an implementation, when the delay parameter is the minimum delay packet ratio value, the determining unit 902 is further configured to, when the delay parameter is less than the first threshold, determine that the first fiber link includes the third network device.

The apparatus 900 is an apparatus corresponding to the method in FIG. 4 that is provided in the foregoing method embodiment, and a specific implementation of each unit of the apparatus 900 has a same concept as the foregoing method embodiment. Therefore, for the specific implementation of each unit of the apparatus 900, refer to the descriptions of FIG. 4 in the foregoing method embodiment. Details are not described herein again.

Figure 10:
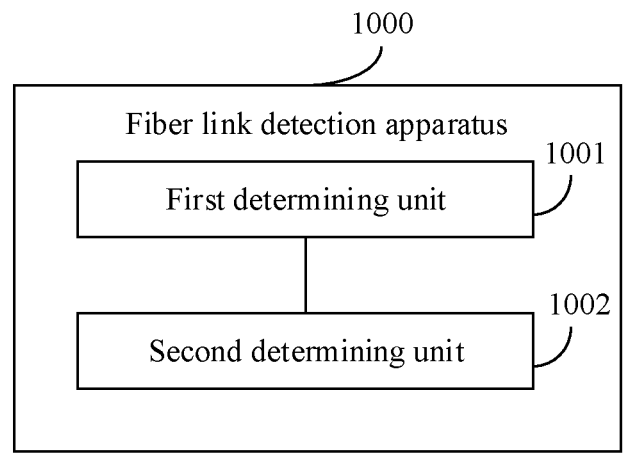
FIG. 10 is a schematic diagram of a structure of a fiber link detection apparatus according to an embodiment of this disclosure.

FIG. 10 is a schematic diagram of a structure of a fiber link detection apparatus according to an embodiment of this disclosure. The fiber link detection apparatus 1000 shown in FIG. 10 may be applied to an optical communications network. The optical communications network includes a first network device and a second network device. A first interface of the first network device communicates with a second interface of the second network device over a first fiber link. Further, the apparatus 1000 may be applied to the first network device mentioned in the foregoing embodiment, and is configured to perform the fiber link detection method performed by the first network device shown in FIG. 5. The apparatus 1000 may further include, for example, a first determining unit 1001 and a second determining unit 1002.

The first determining unit 1001 is configured to determine that the second interface of the second network device is disabled.

The second determining unit 1002 is configured to, if the first interface does not determine an optical signal loss of a light source of the second interface within a period of time, or if the first interface does not determine Ethernet linkdown between the second interface and the first interface within a period of time, determine that the first fiber link includes a third network device. The first network device and the second network device support the PTP, and the third network device does not support PTP.

In an implementation, duration in which the first interface is disabled is first duration, and the first duration is less than or equal to a first threshold.

In an implementation, the apparatus 1000 further includes an output unit configured to output a conclusion used to indicate that the first fiber link includes the third network device.

The apparatus 1000 is an apparatus corresponding to the method in FIG. 5 that is provided in the foregoing method embodiment, and a specific implementation of each unit of the apparatus 1000 has a same concept as the foregoing method embodiment. Therefore, for the specific implementation of each unit of the apparatus 1000, refer to the descriptions of FIG. 5 in the foregoing method embodiment. Details are not described herein again.

Figure 11:
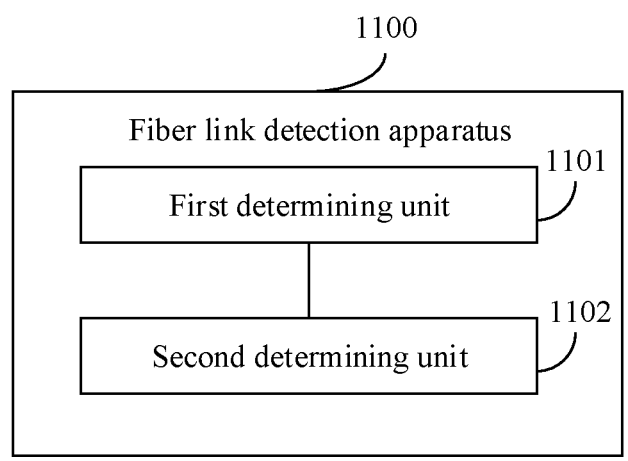
FIG. 11 is a schematic diagram of a structure of a fiber link detection apparatus according to an embodiment of this disclosure.

FIG. 11 is a schematic diagram of a structure of a fiber link detection apparatus according to an embodiment of this disclosure. The fiber link detection apparatus 1100 shown in FIG. 11 may be applied to an optical communications network. The optical communications network includes a first network device and a second network device. A first interface of the first network device communicates with a second interface of the second network device over a first fiber link. Further, the apparatus 1100 may be applied to the first network device mentioned in the foregoing embodiment, and is configured to perform the fiber link detection method performed by the first network device shown in FIG. 6. The apparatus 1100 may further include, for example, a first determining unit 1101 and a second determining unit 1102.

The first determining unit 1101 is configured to determine that a rate at which the second interface sends a PTP packet to the first interface over the first fiber link is a first rate. A difference between the first rate and a preset rate is a first difference, and the preset rate is determined based on an Ethernet service processed by the first network device and the second network device.

The second determining unit 1102 is configured to, if a difference between a second difference and the first difference is greater than or equal to a preset difference, determine that the first fiber link includes a third network device. The first network device and the second network device support PTP, the third network device does not support PTP, and the second difference is a difference between a rate at which the first interface receives a PTP packet and the preset rate.

In an implementation, the apparatus 1100 further includes an output unit configured to output a conclusion used to indicate that the first fiber link includes the third network device.

The apparatus 1100 is an apparatus corresponding to the method in FIG. 6 that is provided in the foregoing method embodiment, and a specific implementation of each unit of the apparatus 1100 has a same concept as the foregoing method embodiment. Therefore, for the specific implementation of each unit of the apparatus 1100, refer to the descriptions of FIG. 6 in the foregoing method embodiment. Details are not described herein again.

Figure 12:
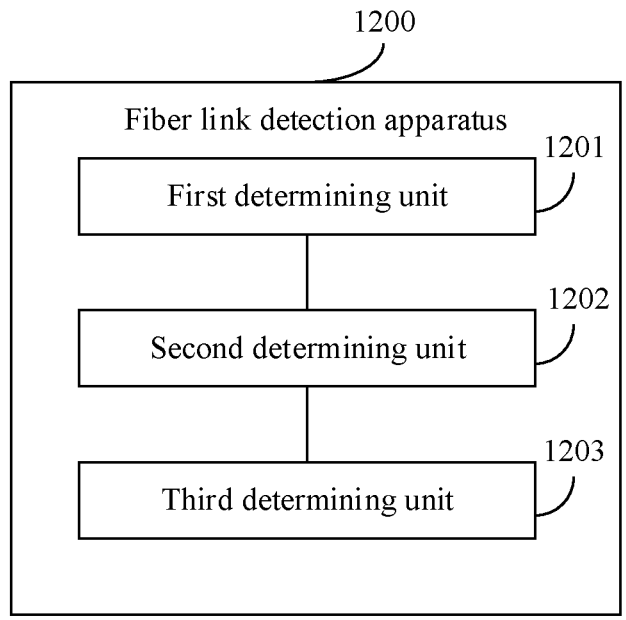
FIG. 12 is a schematic diagram of a structure of a fiber link detection apparatus according to an embodiment of this disclosure.

FIG. 12 is a schematic diagram of a structure of a fiber link detection apparatus according to an embodiment of this disclosure. The fiber link detection apparatus 1200 shown in FIG. 12 may be applied to an optical communications network. The optical communications network includes a first network device and a second network device. A first interface of the first network device communicates with a second interface of the second network device over a first fiber link. Further, the apparatus 1200 may be applied to the first network device mentioned in the foregoing embodiment, and is configured to perform the fiber link detection method performed by the first network device shown in FIG. 7. The apparatus 1200 may further include, for example, a first determining unit 1201, a second determining unit 1202, and a third determining unit 1203.

The first determining unit 1201 is configured to determine that a quantity of Ethernet service preambles included in a PTP packet that is sent by the second interface to the first interface over the first fiber link is a first quantity.

The second determining unit 1202 is configured to determine a second quantity. The second quantity is a quantity of Ethernet service preambles included in a PTP packet that is received by the first interface from the second interface.

The third determining unit 1203 is configured to, if the first quantity is different from the second quantity, determine that the first fiber link includes a third network device. The first network device and the second network device support PTP, and the third network device does not support PTP.

In an implementation, the apparatus 1200 further includes an output unit configured to output a conclusion used to indicate that the first fiber link includes the third network device.

The apparatus 1200 is an apparatus corresponding to the method in FIG. 7 that is provided in the foregoing method embodiment, and a specific implementation of each unit of the apparatus 1200 has a same concept as the foregoing method embodiment. Therefore, for the specific implementation of each unit of the apparatus 1200, refer to the descriptions of FIG. 7 in the foregoing method embodiment. Details are not described herein again.

Figure 13:
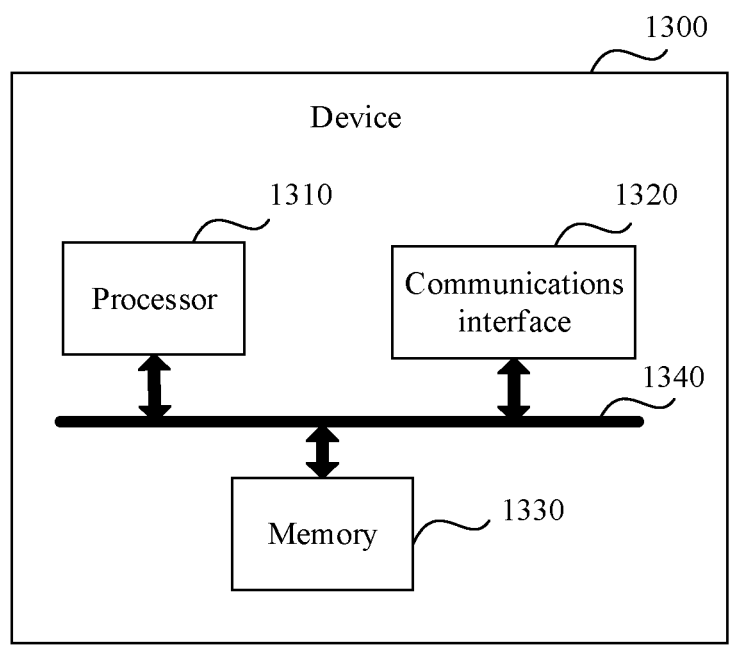
FIG. 13 is a schematic diagram of a structure of a device according to an embodiment of this disclosure.

It should be noted that hardware structures of the fiber link detection apparatus 800, the fiber link detection apparatus 900, the fiber link detection apparatus 1000, the fiber link detection apparatus 1100, and the fiber link detection apparatus 1200 mentioned above each may be a structure shown in FIG. 13. FIG. 13 is a schematic diagram of a structure of a device according to an embodiment of this disclosure.

As shown in FIG. 13, the device 1300 includes a processor 1310, a communications interface 1320, and a memory 1330. The device 1300 may include one or more processors 1310. In FIG. 13, one processor is used as an example. In this embodiment of this disclosure, the processor 1310, the communications interface 1320, and the memory 1330 may be connected by using a bus system or in another manner. In FIG. 13, an example in which a bus system 1340 is used for connection is used.

The processor 1310 may be a central processing unit (CPU), a network processor (NP), or a combination of a CPU and an NP. The processor 1310 may further include a hardware chip. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof.

The memory 1330 may include a volatile memory, for example, a random-access memory (RAM). The memory 1330 may alternatively include a nonvolatile memory, for example, a flash memory, a hard disk drive (HDD), or a solid-state drive (SSD). The memory 1330 may alternatively include a combination of the foregoing types of memories. The memory 1330 may be, for example configured to store the first threshold mentioned in the foregoing embodiment.

Optionally, the memory 1330 stores an operating system and a program, an executable module or a data structure, a subset thereof, or an extended set thereof. The program may include various operation instructions for implementing various operations. The operating system may include various system programs, to implement various basic services and process a hardware-based task. The processor 1310 may read the program in the memory 1330, to implement the fiber link detection method provided in embodiments of this disclosure.

The bus system 1340 may be a Peripheral Component Interconnect (PCI) bus, an Extended Industry Standard Architecture (EISA) bus, or the like. The bus system 1340 may be classified into an address bus, a data bus, a control bus, and the like. For ease of representation, only one thick line is used to represent the bus in FIG. 13, but this does not mean that there is only one bus or only one type of bus.

An embodiment of this disclosure further provides a computer-readable storage medium. The computer-readable storage medium includes instructions or a computer program. When the instructions are run or the computer program is run on a computer, the computer is enabled to perform the fiber link detection method according to the foregoing embodiment.

An embodiment of this disclosure further provides a computer program product including instructions or a computer program. When the computer program product runs on a computer, the computer is enabled to perform the fiber link detection method according to the foregoing embodiment.

The apparatus or the device in this disclosure may be a network device such as a switch or a router, or may be a server, or may be a part of a network device or a server. In some embodiments, the apparatus or the device in this disclosure may alternatively be a function module deployed in a device or a network.

In this specification, the claims, and the accompanying drawings of this disclosure, terms "first", "second", "third", "fourth", and the like (if existent) are intended to distinguish between similar objects but do not necessarily indicate a specific order or sequence. It should be understood that the terms used in such a way are interchangeable in appropriate cases, so that embodiments described herein can be implemented in other orders than the content illustrated or described herein. In addition, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiment. Details are not described herein again.

In the several embodiments provided in this disclosure, it should be understood that the disclosed systems, apparatuses, and methods may be implemented in another manner. For example, the described apparatus embodiment is merely an example. For example, division into units is merely logical service division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one place, or may be distributed on a plurality of network units. Some or all of the units may be selected according to actual requirements to achieve the objectives of the solutions of embodiments.

In addition, service units in embodiments of this disclosure may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this disclosure essentially, or a part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this disclosure. The foregoing storage medium includes any medium that can store program code, such as a Universal Serial Bus (USB) flash drive, a removable hard disk, a read-only memory (ROM), a RAM, a magnetic disk, or an optical disc.

Persons skilled in the art should be aware that, in the foregoing one or more examples, services described in the present application may be implemented by hardware, software, firmware, or any combination thereof. When the present application is implemented by using the software, the services may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or a special-purpose computer.

The objectives, technical solutions, and beneficial effects of the present application have been further described in detail in the foregoing specific implementations. It should be understood that the foregoing descriptions are merely specific implementations of the present application.

Embodiments above are merely intended for describing the technical solutions of this disclosure instead of limiting this disclosure. Although this disclosure is described in detail with reference to embodiments, persons of ordinary skill in the art should understand that they may still make modifications to the technical solutions described in embodiments or make equivalent replacements to some technical features thereof, without departing from the scope of the technical solutions of embodiments of this disclosure.

What is claimed is:

1. A method, comprising:
    obtaining a forward delay value indicating a forward delay of transmitting a first Precision Time Protocol (PTP) packet by a second interface of a second network device to a first interface of a first network device over a fiber link;
    obtaining a reverse delay value indicating a reverse delay of transmitting a second PTP packet by the first interface to the second interface over the fiber link, wherein the fiber link comprises a third network device, wherein the first network device and the second network device support a PTP, and wherein the third network device does not support the PTP;
    obtaining a second timestamp and a first timestamp, wherein the first timestamp indicates a first moment at which the second interface sends a third PTP packet to the first interface over the fiber link, and wherein the second timestamp indicates a second moment at which the first interface receives the third PTP packet;
    setting a first difference between the second timestamp and the first timestamp as the forward delay value;
    obtaining a third timestamp and a fourth timestamp, wherein the third timestamp indicates a third moment at which the first interface sends a fourth PTP packet to the second interface over the fiber link, and wherein the fourth timestamp indicates a fourth moment at which the second interface receives the fourth PTP packet; and setting a second difference between the fourth timestamp and the third timestamp as the reverse delay value.

2. The method of claim 1, wherein the third PTP packet is a synchronization (sync) packet and the fourth PTP packet is a first delay request (delay_req) packet, or wherein the third PTP packet is a delay response (pdelay_resp) packet and the fourth PTP packet is a second delay request (pdelay_req) packet.

3. The method of claim 1, further comprising:
calculating, based on the forward delay value and the reverse delay value, an average delay value of the fiber link, wherein
the average delay value is greater than a first threshold.

4. The method of claim 3, further comprising calculating the first threshold based on a transmission distance of an optical component of the second interface and a transmission delay corresponding to a per-unit transmission distance.

5. The method of claim 1, further comprising:
obtaining N forward delay values and N reverse delay values within a preset time period; and
calculating, based on the N forward delay values and the N reverse delay values, a delay parameter of the fiber link.

6. The method of claim 5, wherein the delay parameter comprises any one or more of:
an average of N average delay values, wherein one of the N average delay values is an average of one of the N forward delay values and one of the N reverse delay values;
a first peak-to-peak value of the N forward delay values;
a second peak-to-peak value of the N reverse delay values;
an average of N time offsets, wherein one of the N time offsets is based on a-first third difference between the one of the N reverse delay values and the one of the N forward delay values;
a minimum delay packet ratio value of a first value to N, wherein the first value is a quantity of second average delay values comprising each of differences from a minimum average delay value is less than a second threshold in the N average delay values, and wherein the minimum average delay value is a minimum value of the N average delay values; or
a fluctuation coefficient of the N average delay values indicating a fluctuation status of the N average delay values.

7. The method of claim 6, wherein the delay parameter is the average of the N average delay values, the first peak-to-peak value, the second peak-to-peak value, the average of the N time offsets, or the fluctuation coefficient and wherein the method further comprises:
identifying that the delay parameter is greater than a first threshold.

8. The method of claim 6, wherein the delay parameter is the minimum delay packet ratio value, and wherein the method further comprises:
identifying that the delay parameter is less than a first threshold.

9. A method, comprising:
obtaining an average delay value indicating an average of a first delay of transmitting a first Precision Time Protocol (PTP) packet by a first interface of a first network device over a fiber link and a second delay of transmitting a second PTP packet by a second interface of a second network device over the fiber link; and
determining, based on the average delay value and a first threshold, that the fiber link comprises a third network device, wherein the first network device and the second network device support a PTP, and wherein the third network device does not support the PTP.

10. The method of claim 9, further comprising:
obtaining a first timestamp indicating a first moment at which the first interface sends a third PTP packet to the second interface over the fiber link, a second timestamp indicating a time difference between a second moment at which the second interface sends a fourth PTP packet and a third moment at which the second interface receives the third PTP packet, and a third timestamp indicating a fourth moment at which the first interface receives the fourth PTP packet from the second interface over the fiber link; and
calculating the average delay value based on the first timestamp, the second timestamp, and the third timestamp.

11. The method of claim 10, wherein the third PTP packet is a delay request (pdelay_req) packet, and wherein the fourth PTP packet is a delay response (pdelay_resp) packet.

12. The method of claim 9, further comprising determining that the fiber link comprises the third network device when the average delay value is greater than the first threshold.

13. The method of claim 12, further comprising, calculating the first threshold based on a transmission distance of an optical component of the second interface and a transmission delay corresponding to a per-unit transmission distance.

14. The method of claim 9, further comprising:
calculating, based on the average delay value, a transmission distance of the fiber link;
calculating, based on the transmission distance, a transmit optical power of an optical component of the second interface, and an optical signal attenuation coefficient of the optical component, a first receive optical power; and
further determining that the fiber link comprises the third network device when an actual optical power of an optical signal received by the first interface is greater than the first receive optical power and a difference between the actual optical power and the first receive optical power is greater than or equal to the first threshold.

15. The method of claim 9, further comprising:
obtaining N average delay values within a preset time period;
calculating, based on the N average delay values, a delay parameter of the fiber link; and
further determining, based on the delay parameter and the first threshold, that the fiber link comprises the third network device.

16. The method of claim 15, wherein the delay parameter comprises one or more of:
an average of the N average delay values,
a minimum delay packet ratio value of a first value to N, wherein the first value is a quantity of second average delay values comprising each of differences from a minimum average delay value is less than a second threshold in the N average delay values, and wherein the minimum average delay value is a minimum value of the N average delay values; or a fluctuation coefficient of the N average delay values indicating a fluctuation status of the N average delay values.

17. The method of claim 16, wherein the delay parameter is the average of the N average delay values or the fluctuation coefficient and wherein the method further comprises:
    identifying that the delay parameter is greater than the first threshold; and
    further determining, in response to identifying that the delay parameter is greater than the first threshold, that the fiber link comprises the third network device.

18. The method of claim 16, wherein the delay parameter is the minimum delay packet ratio value, and wherein the method further comprises:
    identifying that the delay parameter is less than the first threshold; and
    further determining, in response to identifying that the delay parameter is less than the first threshold, that the fiber link comprises the third network device.

19. A method, comprising:
    obtaining a forward delay value indicating a forward delay of transmitting a first Precision Time Protocol (PTP) packet by a second interface of a second network device to a first interface of a first network device over a fiber link;
    obtaining a reverse delay value indicating a reverse delay of transmitting a second PTP packet by the first interface to the second interface over the fiber link, wherein the fiber link comprises a third network device, wherein the first network device and the second network device support a PTP, and wherein the third network device does not support the PTP;
    calculating, based on the forward delay value and the reverse delay value, an average delay value of the fiber link;
    calculating, based on the average delay value, a transmission distance of the fiber link;
    calculating, based on the transmission distance, a transmit optical power of an optical component of the second interface, and an optical signal attenuation coefficient of the optical component, a first receive optical power; and
    further detecting that the fiber link comprises the third network device when an actual optical power of an optical signal received by the first interface is greater than the first receive optical power and a difference between the actual optical power and the first receive optical power is greater than or equal to a first threshold.

* * * * *